United States Patent
Otsuki et al.

(10) Patent No.: US 7,239,938 B2
(45) Date of Patent: Jul. 3, 2007

(54) INTERFERENCE CHECKING FOR A NUMERICAL CONTROL DEVICE

(75) Inventors: Toshiaki Otsuki, Hino (JP); Soichiro Ide, Fujiyoshida (JP); Takafumi Sasaki, Yamanashi (JP)

(73) Assignee: FANUC LTD, Yamanashi (JP)

( * ) Notice: Subject to any disclaimer, the term of this patent is extended or adjusted under 35 U.S.C. 154(b) by 51 days.

(21) Appl. No.: 10/968,127

(22) Filed: Oct. 20, 2004

(65) Prior Publication Data
US 2005/0090930 A1 Apr. 28, 2005

(30) Foreign Application Priority Data
Oct. 22, 2003 (JP) ............................. 2003-361755

(51) Int. Cl.
*G06F 19/00* (2006.01)
(52) U.S. Cl. ...................... 700/178; 700/159; 700/189
(58) Field of Classification Search ............... 700/159, 700/182, 184, 186, 187, 189, 190, 192, 174, 700/177, 178
See application file for complete search history.

(56) References Cited

U.S. PATENT DOCUMENTS

| | | | | |
|---|---|---|---|---|
| 5,388,199 A | * | 2/1995 | Kakazu et al. | 715/853 |
| 5,625,575 A | * | 4/1997 | Goyal et al. | 703/6 |
| 5,888,037 A | * | 3/1999 | Fujimoto et al. | 700/188 |
| 6,356,800 B1 | * | 3/2002 | Monz et al. | 700/184 |
| 6,459,952 B1 | * | 10/2002 | Dundorf | 700/182 |
| 6,604,015 B2 | * | 8/2003 | Iriguchi et al. | 700/187 |
| 6,775,586 B2 | * | 8/2004 | Shibata et al. | 700/189 |
| 6,824,336 B2 | * | 11/2004 | Izutsu et al. | 700/188 |
| 6,920,370 B2 | * | 7/2005 | Wehrli et al. | 700/177 |

FOREIGN PATENT DOCUMENTS

| | | | |
|---|---|---|---|
| JP | 01-173205 | * | 7/1989 |
| JP | 08-115114 | | 5/1996 |
| JP | 09-230918 | | 9/1997 |

OTHER PUBLICATIONS

Notice of Grounds for Rejection (Office Action) mailed Jun. 20, 2006 in corresponding Japanese Patent Application 2003-361755.

* cited by examiner

*Primary Examiner*—Charles R. Kasenge
(74) *Attorney, Agent, or Firm*—Staas & Halsey LLP

(57) ABSTRACT

The shapes of machine parts for which the possibility of interference exists are defined as rectangular parallelepipeds and it is judged whether or not there is interference between a first rectangular parallelepiped of a first machine part and a second rectangular parallelepiped of a second machine part. The method involves rotating the first rectangular parallelepiped and second rectangular parallelepiped so that each side of the first rectangular parallelepiped lies parallel to each axis of the reference coordinate system. Interference is thus judged based on whether any vertex of the second rectangular parallelepiped exists within the first rectangular parallelepiped. Likewise, interference is judged depending on whether any vertex of the first rectangular parallelepiped exists within the second rectangular parallelepiped. Further, interference between the respective sides of the first rectangular parallelepiped and second rectangular parallelepiped is judged through division into the planes X-Y, Y-Z, and Z-X. When it is judged that interference exists in all planes, it is judged that there will be interference between the first rectangular parallelepiped and second rectangular parallelepiped.

11 Claims, 13 Drawing Sheets

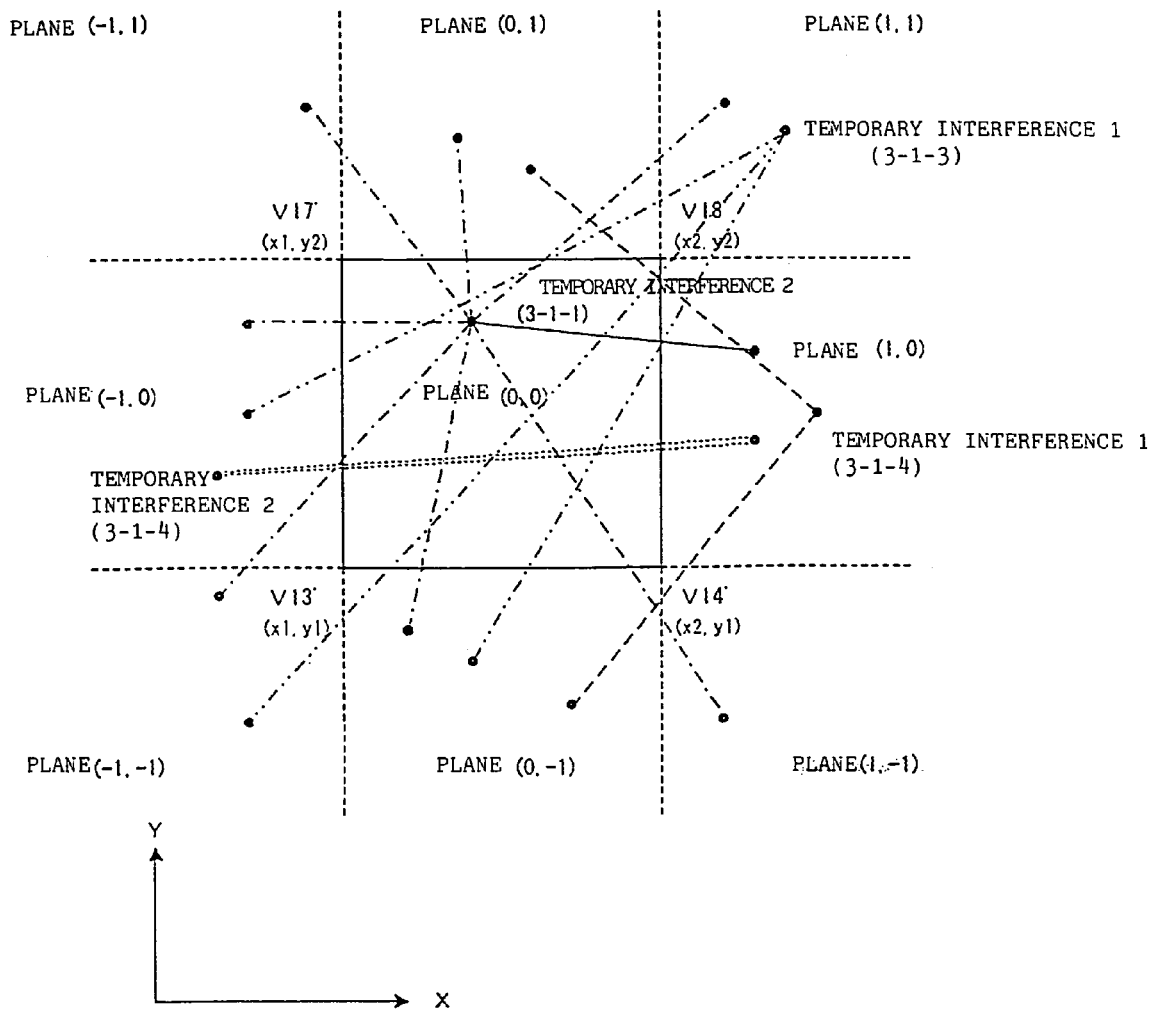
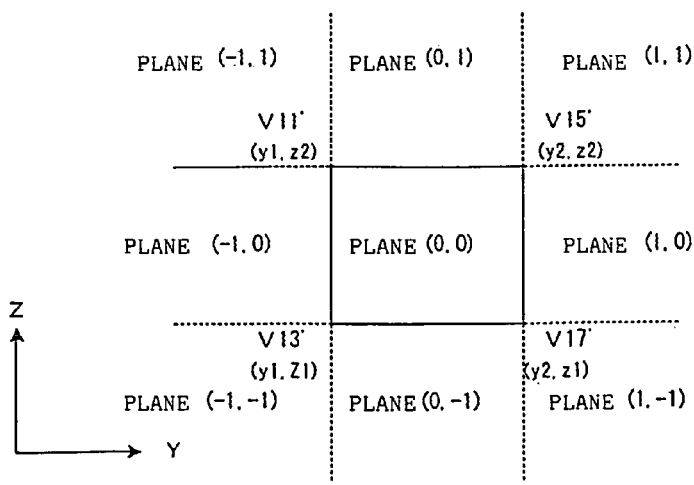

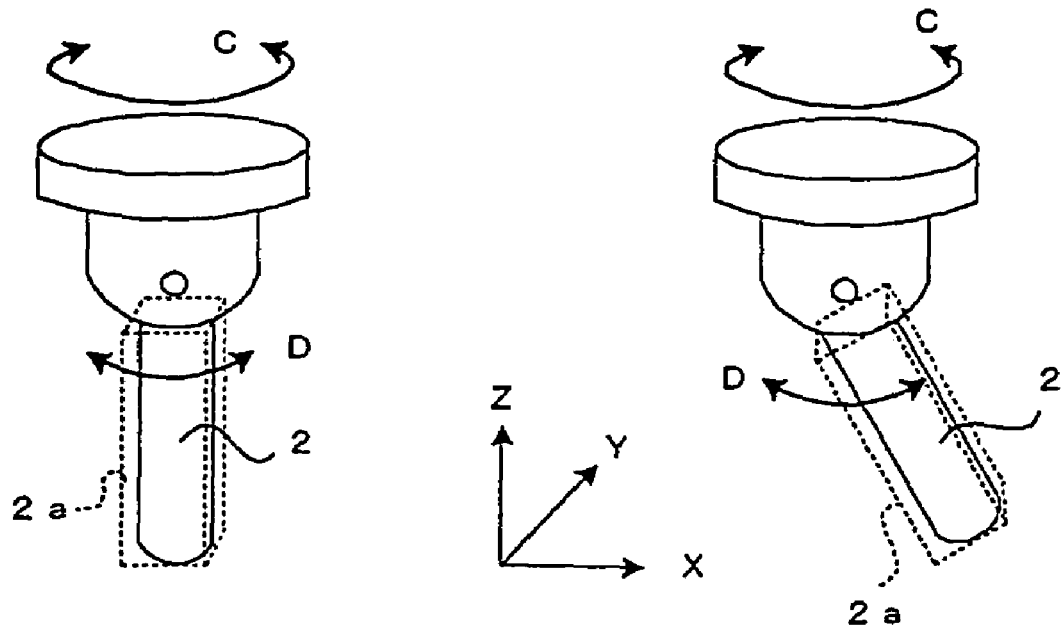
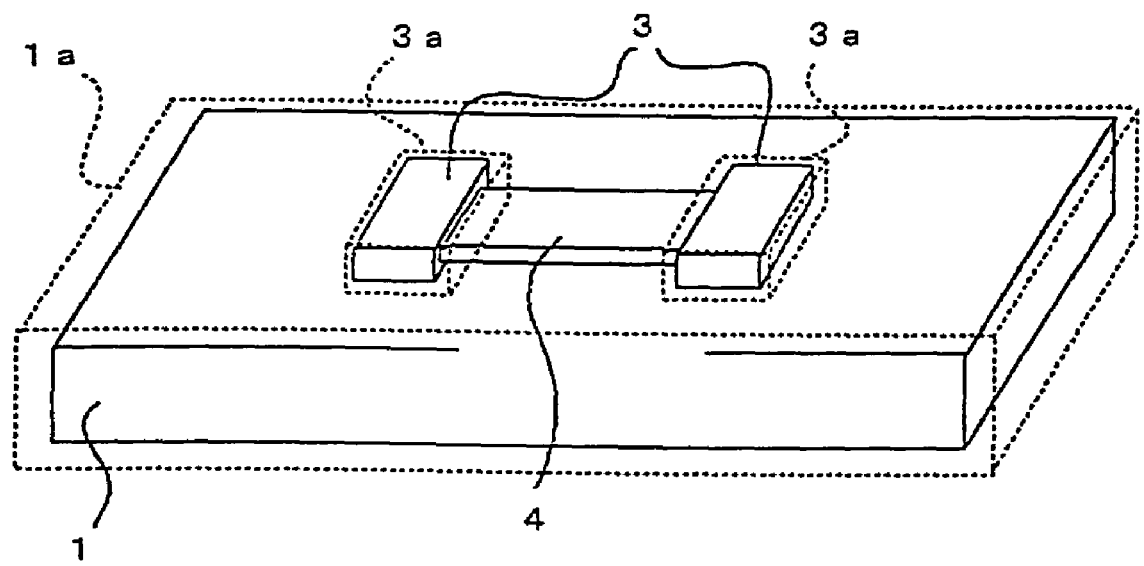
FIG. 19

INTERFERENCE CHECKING FOR A NUMERICAL CONTROL DEVICE

BACKGROUND OF THE INVENTION

1. Field of the Invention

The present invention relates to a numerical control device with an interference check function.

2. Description of the Related Art

While a workpiece (machined object) is machined by a machining tool, each of the machine parts, such as a tool, table, jig for clamping the workpiece and spindle stock, inevitably interfere with each other. Hence, conventionally, an interference check to determine whether or not machine parts do not interfere with one another is made.

For example, Japanese Patent Application Laid Open No. H9-230918 discloses a method in which machine parts, such as tools, that are at a risk of interfering with each other are defined by a combination of several solid bodies and stored in memory as interference objects, and the positions of current interference objects, the displaced positions of axially displaced interference objects are found by interpolating movement commands and, in the displacement from the positions of the interference objects prior to interpolation to the positions of the interference objects following interpolation, the areas of interference of solid-body shapes constituting the interference objects are calculated as interference judgment solid bodies, interference judgment areas are established by means of a combination of interference judgment solid bodies, and the existence of interference is judged on the basis of the interference judgment areas thus established.

Furthermore, Japanese Patent Application Laid Open No. H8-115114 discloses a method that-establishes data for solid-body regions surrounding tools and data for entry prohibition areas, displaces the axes of the tools in accordance with a machining program, calculates the positions of current solid-body regions of tools from the current positions of the tool axes and the data for the solid-body regions surrounding the tools, and judges whether the current solid-body regions of the tools interfere with the entry prohibition regions.

Known machining tools include a 5-axis machining tool that comprises two rotational axes in addition to the feed shafts with the three basic X, Y and Z axes. FIGS. 17 to 19 show an outline of this 5-axis machining tool. In the case of the 5-axis machining tool shown in FIG. 17, a table 1 is driven in the direction of the X axis and in the direction of the Y axis, which is orthogonal to the X axis, and is rotatably driven about the A axis and B axis. A tool 2 is driven in the direction of the Z axis, which is orthogonal to the X axis and Y axis. The A axis is a rotational axis parallel to the Z axis, and the B axis is a rotational axis parallel to the X axis. FIG. 17 shows a state where a workpiece 4 is attached to the table 1 by means of a jig 3.

In the case of the 5-axis machining tool shown in FIG. 18, in addition to the table 1 being driven in the directions of the X and Y axes and tool 2 being driven in the direction of the Z axis, table 1 is rotated about the B axis and tool 2 is rotated (tilted) about the D axis. The B axis is a rotational axis parallel to the X axis and the D axis is a rotational axis parallel to the Y axis.

In the case of the 5-axis machining tool shown in FIG. 19, in addition to table 1 being driven in the direction of the X axis and Y axis and tool 2 being driven in the direction of the Z axis, tool 2 is also rotated about the C and D axes. The C axis is a rotational axis parallel to the Z axis and the D axis is a rotational axis that is disposed on plane XY.

Various types of 5-axis machining tools are known as mentioned above.

However, an interference check method that is suitable for the 5-axis machining tool described above has not been known yet. In the case of the interference check method disclosed by the Japanese Patent Application Laid Open No. H9-230918, in the displacement from the positions of interference objects prior to interpolation to the positions of the interference objects following interpolation, because the regions of interference of the solid-body shapes constituting the interference objects are calculated as interference judgment solid bodies, a complex calculation is required when this method is applied to a 5-axis machining tool, which makes this method unsuitable for a 5-axis machining tool.

Further, the interference check method disclosed by the Japanese Patent Application Laid Open No. H8-115114 can be applied to only a case where tool axes are displaced, and hence this method is not suitable for the variety of types of 5-axis machining tool mentioned above.

Meanwhile, in the case of a 5-axis machining tool, because the table, tool, and so forth are rotated and tilted, it is hard to estimate the positional relationships of the machine parts such as tools prior to machining, and interference between machine parts sometimes occurs when it is not expected during machining. When interference occurs between machine parts, machines, tools, or workpieces are damaged. For this reason, automatic interference checking for 5-axis machining tools is an essential task.

SUMMARY OF THE INVENTION

An object of the present invention is to provide a numerical control device equipped with an interference check function that is also suitable for 5-axis machining tools of a variety of types.

The present invention is a numerical control device that drive-controls each axis of a machining tool on the basis of a machining program, comprising a memory for storing data rendered by defining the shape of a machine part of the machining tool by means of a polyhedron; an instruction analysis unit that analyzes the machining program and generates data for an operation path; interpolation means that output a position on the operation: path for each sampling cycle on the basis of the generated data; means for finding the positions of the polyhedron shapes in accordance with each axial position generated by the interpolation means; and interference checking means that check whether there is interference between the polyhedron shapes in the positions of the polyhedron shapes thus found, wherein the numerical control device is able to check for interference between machine parts. Further, the shapes of the machine parts are defined by a combination of one or more polyhedrons, and the polyhedron is a rectangular parallelepiped. In addition, the interference checking means check whether a vertex of one rectangular parallelepiped belonging to a first machine part interferes with one rectangular parallelepiped belonging to a second machine part and whether a side of one rectangular parallelepiped belonging to the first machine part interferes with one rectangular parallelepiped belonging to the second machine part. In addition, interpolation is terminated when interference is judged by the interference checking means.

The axes of the machining tool include at least one rotational axis. The numerical control device comprises a tool that can be tilted by at least one rotational axis.

Alternatively, the numerical control device comprises a table that is rotated by at least one rotational axis. Furthermore, the numerical control device comprises a tool and a table that are rotated by at least two rotational axes.

As a result of the above constitution, because interference of machine parts in positions that are interpolated on the basis of a machining program is checked, polyhedron data specifying the shapes of machine parts has to be stored in the case of the present invention, so that it is possible to judge interference simply, thereby allowing an interference check to be performed easily even for a machining tool, such as a 5-axis machining tool, in which a tool, table, and so forth rotate.

BRIEF DESCRIPTION OF THE DRAWINGS

The above objects and characteristics and additional objects and characteristics of the present invention will become evident from the embodiment description below with reference to the following attached drawings:

FIG. 6 is an explanatory view for the judgment that a side of a first rectangular parallelepiped interferes with a side of a second rectangular parallelepiped;

FIG. 7 is an explanatory view for a case where plane Y-Z is divided into nine, with the face parallel to plane Y-Z of the first rectangular parallelepiped lying at the center of FIG. 7;

FIG. 19 is an outline explanatory view of a 5-axis machining tool in which a tool rotates about two rotational axes.

DESCRIPTION OF THE EMBODIMENTS

A specific algorithm of the interference check function of the present invention will now be described.

Figure 17:
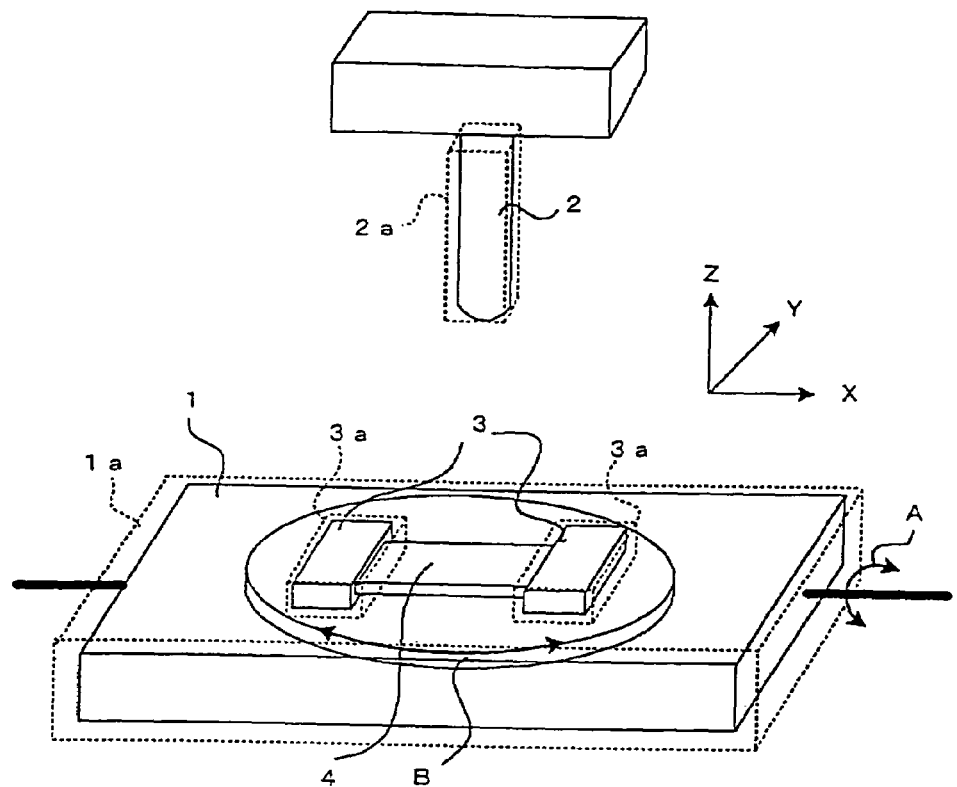
FIG. 17 is an outline explanatory view of a 5-axis machining tool that comprises a table with two rotational axes.
Figure 18:
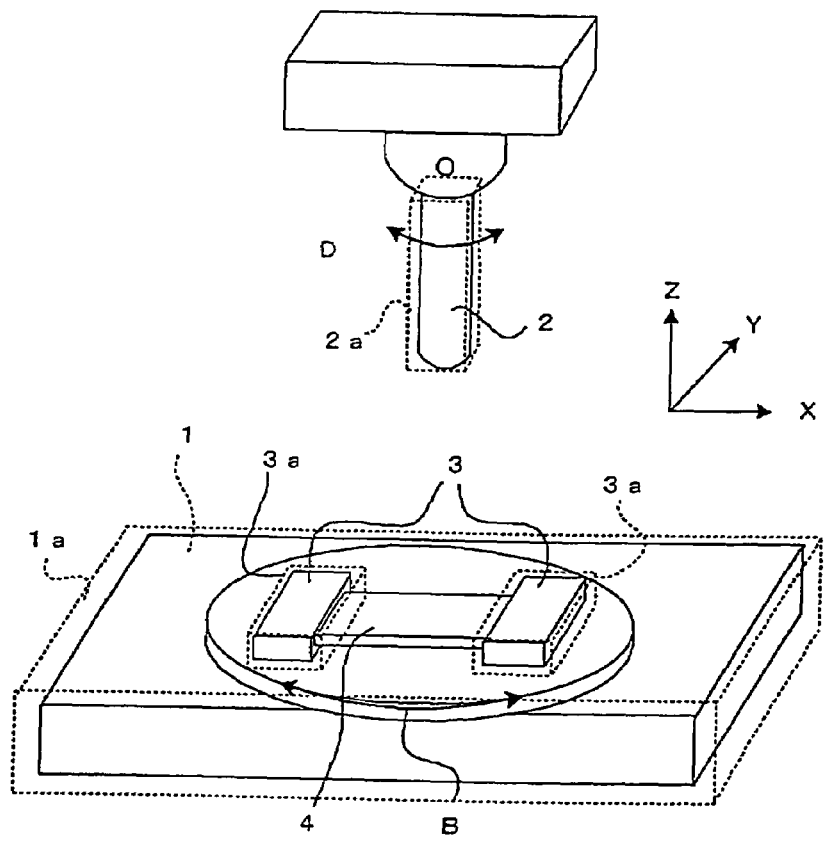
FIG. 18 is an outline explanatory view of a 5-axis machining tool in which a table with one rotational axis and a tool are tilted about one rotational axis.

In the present invention, the respective shapes of a machine part 1 and machine part 2 are defined by means of a combination of one or more polyhedrons and judgment of whether there is interference between the machine part 1 and machine part 2 or not is checked by means of a judgment of whether a polyhedron of the machine part 1 interferes with a polyhedron of the machine part 2. For example, FIGS. 17 to 19 illustrate an example in which the shapes of machine parts, such as a table, tool or jig, are defined by means of the respective polyhedrons 1a, 2a, and 3a. Here, supposing that the polyhedron is a rectangular parallelepiped, the machine part 1 is constituted by rectangular parallelepipeds 11, 12, . . . , 1n, and the machine part 2 that may interfere with the machine part 1 is constituted by rectangular parallelepipeds 21, 22, . . . , 2m, a round-robin check is performed to check whether there is interference between any one of these rectangular parallelepipeds 11, 12, . . . , in and any one of the rectangular parallelepipeds 21, 22, . . . , 2m.

One optional rectangular parallelepiped 1p is selected from among the rectangular parallelepipeds 11, 12, . . . , 1n of the machine part 1 and one optional rectangular parallelepiped 2q is selected from among the rectangular parallelepipeds 21, 22, . . . , 2m of the machine part 2. A check for interference to be made when these rectangular parallelepipeds 1p and 2q are optionally rotated/displaced in parallel is then made. A description of this procedure will be provided below.

Figure 1:
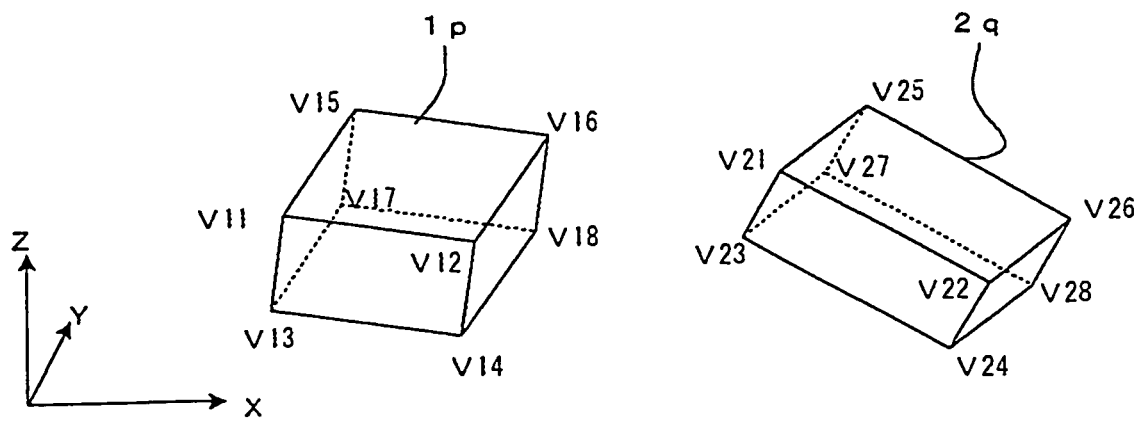
FIG. 1 shows optional positions and attitude states of rectangular parallelepipeds that constitute the shapes of two machine parts as in a case where interference may occur.

Suppose that a machining tool operates and that the rectangular parallelepiped 1p of the machine part 1 and the rectangular parallelepiped 2q of the machine part 2 are in the states shown in FIG. 1. The vertices of the rectangular parallelepiped 1p are V11, V12, V13, V14, V15, V16, V17, and V18, as shown in FIG. 1. Likewise, the vertices of the rectangular parallelepiped 2q are V21, V22, V23, V24, V25, V26, V27, and V28.

(1) Rotation that Adapts the Rectangular Parallelepiped 1p to a Reference Coordinate System:

A conversion matrix M1, which rotationally converts the rectangular parallelepiped 1p so that each side of the rectangular parallelepiped 1p is parallel to each axis of the reference coordinate system (an X, Y, Z axis coordinate system), is found and the coordinate values of each vertex are determined. The respective vertices of the converted rectangular parallelepiped 1p' are V11', V12', V13', V14', V15', V16', V17', and V18'. Supposing that the conversion matrix M1 is the following Equation 1, the vertex V11 is subjected to the calculation of the following Equation 2 to find the coordinate values (x,y,z) of the vertex V11', for example. The other vertices are calculated in the same manner.

$$M1 = \begin{pmatrix} m111 & m112 & m113 \\ m121 & m122 & m123 \\ m121 & m132 & m133 \end{pmatrix} \quad (1)$$

$$\begin{pmatrix} V11'x \\ V11'x \\ V11'x \end{pmatrix} = M1 \begin{pmatrix} V11x \\ V11y \\ V11z \end{pmatrix} \quad (2)$$

Figure 2:
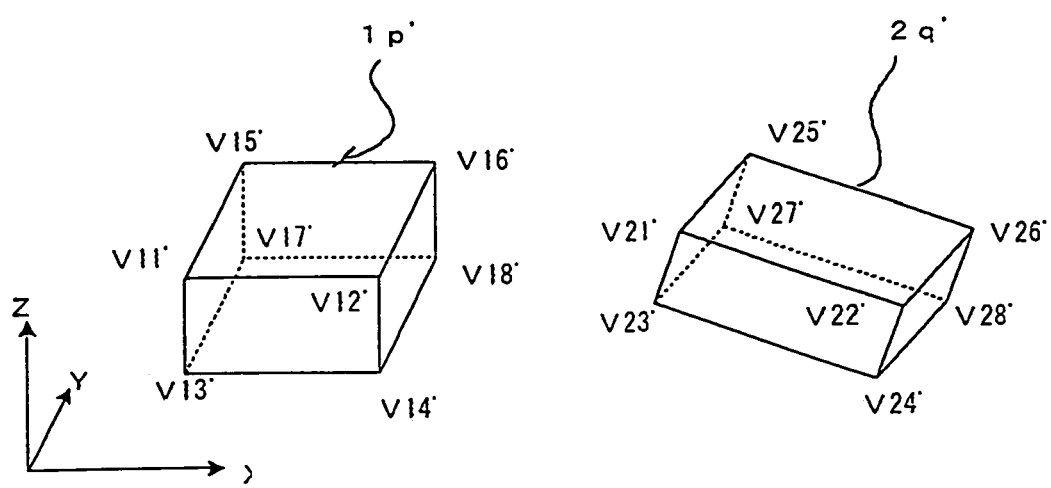
FIG. 2 represents a state where two rectangular parallelepipeds are rotated so that each side of the rectangular parallelepiped constituting the shape of a first machine part is parallel to each axis of the reference coordinate system.

Further, the respective vertices of the rectangular parallelepiped 2q are similarly converted by using the conversion matrix M1 thus found, and the coordinate values of the respective vertices V21', V22', V23', V24', V25', V26', V27', and V28' of the rectangular parallelepiped 2q' found through this conversion are found. FIG. 2 shows a state of the rectangular parallelepipeds 1p' and 2q' that have been converted such that each side of the rectangular parallelepiped 1p is parallel to each axis of the reference coordinate system.

Figure 3:
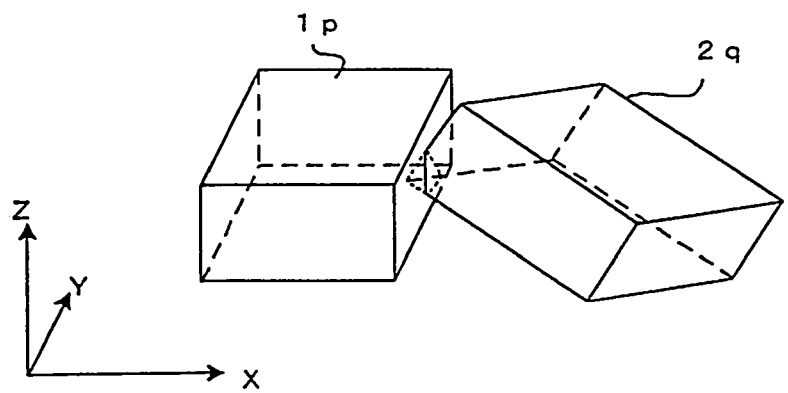
FIG. 3 illustrates the occurrence of interference as a result of the existence of a vertex of the second rectangular parallelepiped in the first rectangular parallelepiped.
Figure 4:
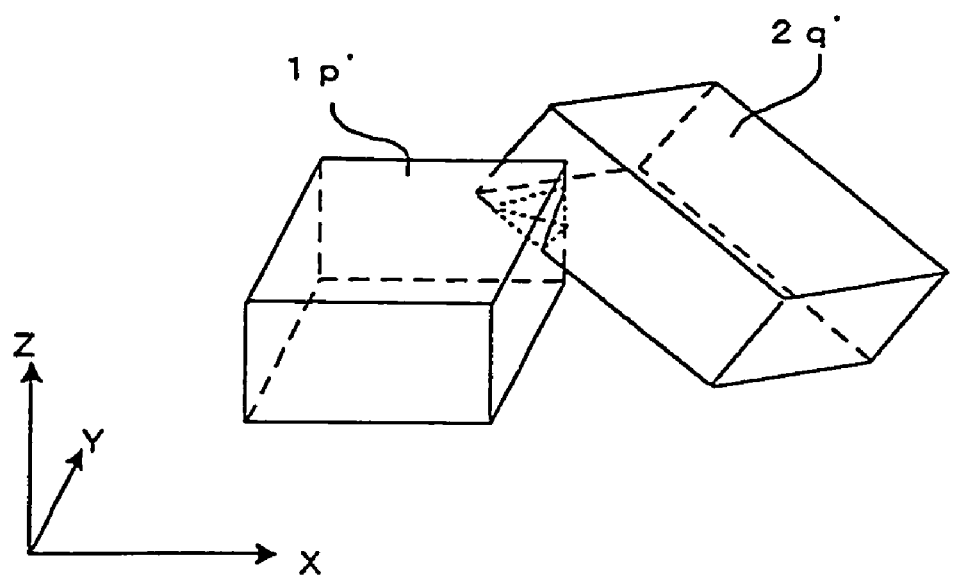
FIG. 4 illustrates a state where a side of a first rectangular parallelepiped interferes with a side of a second rectangular parallelepiped.

An interference check for the rectangular parallelepipeds 1p' and 2q' is performed in this state. The rectangular parallelepiped 2q' interferes with the rectangular parallelepiped 1p' when (a) any vertex of the rectangular parallelepiped 2q' is within the rectangular parallelepiped 1p' as shown in FIG. 3 and (b) when part of at least one side among 12 sides of the rectangular parallelepiped 2q' exists within the rectangular parallelepiped 1p' as shown in FIG. 4.

(2) Check to determine whether each vertex of the rectangular parallelepiped 2q' lies within the rectangular parallelepiped 1p':

A vertex α (x1, y1, z1) and vertex β (x2, y2, z2) that satisfy x1<x2, y1<y2, and z1<z2 among the eight vertices of the rectangular parallelepiped 1p' are selected. In the above example of the rectangular parallelepiped 1p', vertex V13' is chosen as the vertex α, and the vertex V16' is chosen as vertex β. Supposing that any one of the eight vertices of the rectangular parallelepiped 2q' is considered and that the coordinates of this vertex are (X0, Y0, Z0), when the following 'Condition 1' is established, this means that the vertex is within the rectangular parallelepiped 1p' and interference exists.

'Condition 1': x1≦X0≦x2 and y1≦Y0≦y2, and z1≦Z0≦z2

Supposing that any one of the eight vertices of the rectangular parallelepiped 2q' does satisfy the 'Condition 1', this means that the rectangular parallelepiped 2q' interferes with the rectangular parallelepiped 1p'. When none of the eight vertices satisfies the 'Condition 1', because it is not clear whether the rectangular parallelepiped 2q' interferes with the rectangular parallelepiped 1p', so that an additional interference check is made.

(3) Check to determined whether one side of the rectangular parallelepiped 2q' exists within the rectangular parallelepiped 1p'

Suppose that, when any one of the twelve sides of the rectangular parallelepiped 2q' is considered, the coordinates of one end (vertex) of the side are (X1, Y1, Z1) and the coordinates of the other end (vertex) are (X2,Y2,Z2).

Figure 5:
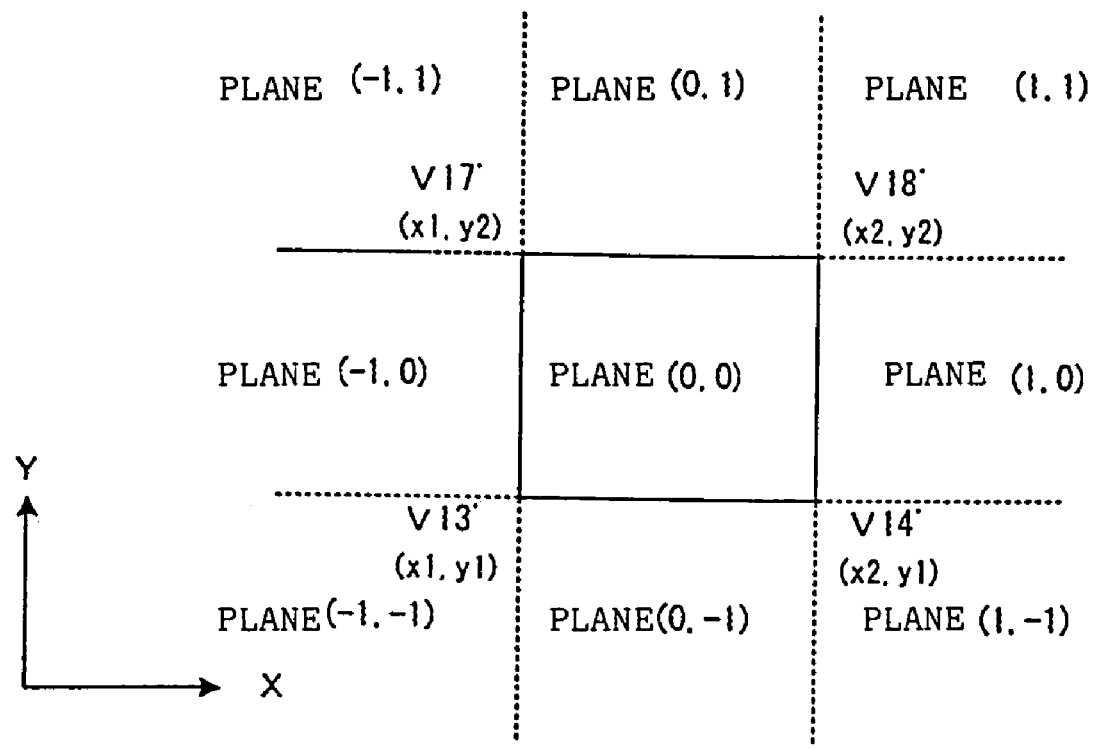
FIG. 5 illustrates a case where plane X-Y is divided into nine, with the face parallel to plane X-Y of the first rectangular parallelepiped lying at the center of FIG. 5.

(3-1) Check in plane X-Y:

By denoting a face of the rectangular parallelepiped 1p' that is parallel to the plane X-Y of the reference coordinate system (although such faces exist two, coordinate values of these faces on the X axis and Y axis are the same, and hence a face formed by the vertices V13', V14', V18' and V17' is shown in FIG. 5) as plane (0,0) and extending each side of the plane (0,0) to produce the planes (1,1), (1,0), (1,−1), (0,1), (0,−1), (−1,1), (−1,0), and (−1,−1), plane X-Y is divided into a total of nine planes. Further, the X-Y coordinates of vertex V13' in FIG. 5 are (x1,y1) and the X-Y coordinates of vertex V18' are (x2, y2).

(3-1-1) When one end exists in plane (0,0) (see "temporary interference 2 (3-1-1)" in FIG. 6);

When either the X-Y coordinates (X1, Y1) of one end of the one side of the rectangular parallelepiped 2q' that is being considered or the X-Y coordinates (X2, Y2) of the other end of the side exist in the plane (0, 0), the side of the rectangular parallelepiped 2q' then intersects the plane (0, 0) and, as a result, viewed from at least plane X-Y, there is the possibility of interference between the side and the rectangular parallelepiped 1p, meaning that temporary interference 2 exists. That is, when x1≦X1≦x2 and y1≦Y1≦y2, or
x1≦X2≦x2 and x1≦Y2≦y2, the end of one side of the rectangular parallelepiped 2q' exists in the plane (0, 0) and renders temporary interference 2. Further, as described subsequently, an interference judgment for temporary interference 2 is also applied to plane Y-Z and plane Z-X and, if it is judged that temporary interference 2 exists in all planes, then it is judged that the rectangular parallelepiped 2q' interferes with the rectangular parallelepiped 1p.

(3-1-2) When both ends exist in a plane other than the plane (0, 0);

When both one end (X1, Y1) and the other end (X2, Y2) of one side of the rectangular parallelepiped 2q' exist in the same plane other than the plane (0, 0), noninterference is judged.

Supposing that plane (0, 0) is a plane X-Y that is surrounded by point (x1, y2), point (x1, y1), point (x2, y1), and point (x2, y2), as shown in FIG. 5, noninterference is judged in cases where one end (X1, Y1) and the other end (X2, Y2) of one side of the rectangular parallelepiped 2q' lie-within the plane (1, 1) when x2<X1, X2 and y2<Y1, Y2, lie within the plane (1, 0) when x2<X1, X2 and y1<Y1, Y2<y2, lie within the plane (1, −1) when x2<X1, X2 and y1>Y1, Y2, lie within the plane (0, 1) when x1<X1, X2<x2 and y2<Y1, Y2, lie within the plane (0, −1) when x1<X1, X2<x2 and y1>Y1, Y2, lie within the plane (−1, 1) when x1>X1, X2 and y2<Y1, Y2, lie within the plane (−1, 0) when x1>X1, X2 and y2<Y1, Y2<y2, and lie within the plane (−1, −1) when x1>X1, X2 and y1>Y1, Y2.

(3-1-3) When one end exists in the planes at the four corners of plane (0, 0) (see "temporary interference 1 (3-1-3)" in FIG. 6).

When one end (X1, Y1) of one side of the rectangular parallelepiped 2q' exists in one of the planes (η, ζ) ((1, 1), (1, −1), (−1, −1) and (−1, 1)) at the four corners of plane (0, 0) and when the other end (X2, Y2) is in the plane (η', ζ'), noninterference exists unless η≠η and ζ≠ζ'. Thus, when noninterference cannot be judged, temporary interference 1 is judged. For example, in FIG. 6, when one end of the side exists in plane (1, 1), noninterference exists unless the other end is in the planes (0, −1), (−1, 0), and (−1, −1). Otherwise, temporary interference 1 exists. Temporary interference 1 means that there is the possibility of interference in the coordinate plane. In the above example, there are cases where the side intersects the plane (0, 0) but also where no such intersection takes place. Temporary interference 1 exists in such a case.

(3-1-4) When both ends exist in a plane that shares one side of plane (0, 0) and in a plane that shares the other side of plane (0, 0);

When one end of one side of the rectangular parallelepiped 2q' exists in one plane (η, ζ) that shares one side of plane (0, 0), the other end exists in the plane (η', ζ') that shares the other side of plane (0, 0), and either n≠n' or ζ≠ζ' is fulfilled, temporary interference 2 is judged, otherwise temporary interference 1 is judged. For example, in FIG. 6, when one end is in plane (1, 0) and the other one end is in plane (–1, 0), temporary interference 2 (see "temporary interference 2 (3-1-4)" in FIG. 6) is judged because the side compulsorily intersects plane (0,0) of the X-Y coordinates. Otherwise, temporary interference 1 (see "temporary interference 1 (3-1-4)" in FIG. 6) is judged because intersection may or may not exist.

(3-1-5) Additional judgment to be performed when temporary interference 1 is judged:

In cases where temporary interference 1 is judged in the respective judgment processing described above, a judgment of whether temporary interference 2 exists in the coordinate plane is also performed. This processing creates a straight line L that passes through one end (X1, Y1) and the other end (X2, Y2) of one side of the rectangular parallelepiped 2q' and judges that temporary interference 2 exists if at least one of four points of the rectangular parallelepiped 1p' on the X-Y coordinates exists on the straight line L. In addition, if all four points of the rectangular parallelepiped 1p' on the X-Y coordinates exist on one side of the straight line L, noninterference is judged. Otherwise, temporary interference 2 is judged.

That is, if all four points of the rectangular parallelepiped 1p' on the X-Y coordinates are on one side of the straight line L, when the plane X-Y is divided by the straight line L, plane (0, 0) is not divided, which means that the straight line L does not pass through the rectangular parallelepiped 1p'.

Supposing that one end (x, y) of one side of the rectangular parallelepiped 1p' is on the straight line L that passes through one end (X1, Y1) and the other end (X2, Y2) of the side of the rectangular parallelepiped 2q', the Equation 3 below is established.

$$(Y2-Y1)/(X2-X1)=(y-Y1)/x-X1) \quad (3)$$

According to Equation 3, $$(Y1-Y2)*x+(X2-X1)*y+(Y2-Y1)*X1+(X2-X1)*Y1=0 \quad (4)$$

is established.

Therefore, the four points of the rectangular parallelepiped 1p' on the X-Y coordinates are then V13' (x1, y1), V14' (x2, y1), V18' (x2, y2), and V17' (x1, y2), the values being PH1, PH2, PH3, and PH4 when x, y in Equation (4) mentioned above are substituted by x1, y1; x2, y1; x2, y2; x1, y2. That is, (Y1−Y2)*x1+(X2−X1)*y1+(Y2−Y1)*X1+(X2−X1) *Y1=PH1

(Y1−Y2)*x2+(X2−X1)*y1+(Y2−Y1)*X1+(X2−X1) *Y1=PH2

(Y1−Y2)*x2+(X2−X1)*y2+(Y2−Y1)*X1+(X2−X1) *Y1=PH3

(Y1−Y2)*x1+(X2−X1)*y2+(Y2−Y1)*X1+(X2−X1) *Y1=PH4

If any of PH1, PH2, PH3, and PH4 mentioned above is '0', any of the corresponding vertices V13', V14', V18', and V17' exists on the straight line L and hence temporary interference 2 is judged.

Further, if none of PH1, PH2, PH3, and PH4 mentioned above is '0', and all have the same symbol, the four ends are all on the same side, and therefore noninterference exists. On the other hand, if one or several of PH1, PH2, PH3, and PH4 are positive values and the remainder have negative values, temporary interference 2 is judged.

(3-2) Check in plane Y-Z:

As per the interference check in plane X-Y of (3-1) mentioned above, by denoting a face of the rectangular parallelepiped 1p' that is parallel to plane Y-Z of the reference coordinate system plane (one of the two that exist; a face that is formed by vertices V13', V17', V15' and V11' is shown in FIG. 7) as (0, 0), and extending each side of plane (0, 0) to produce planes (1, 1), (1, 0), (1, –1), (0, 1), (0, –1), (–1, 1), (–1, 0), and (–1, –1), thus plane Y-Z is divided into a total of nine planes. Further, an interference check that is the same as the interference check performed for plane X-Y is also executed for plane Y-Z.

Figure 8:
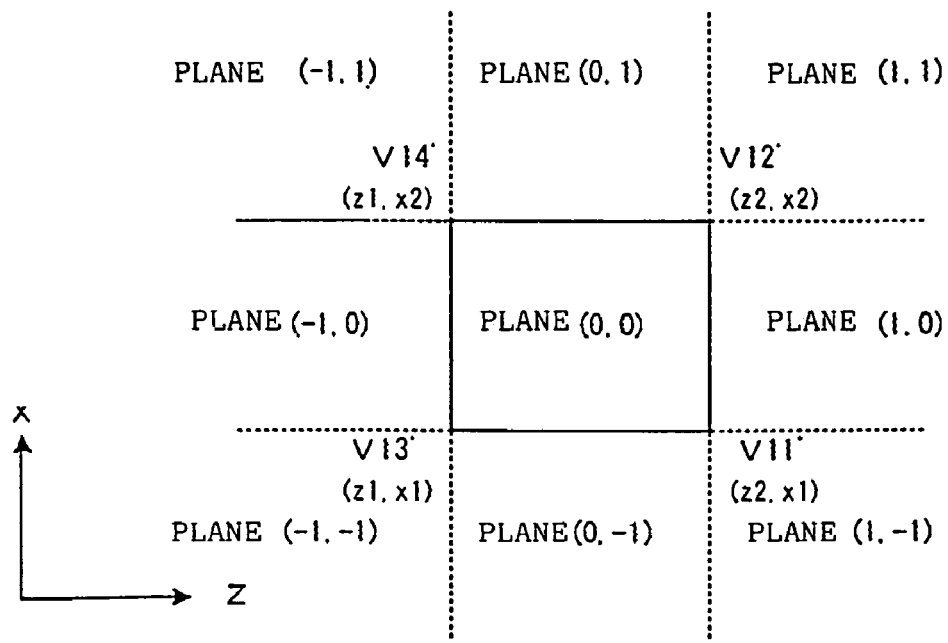
FIG. 8 is an explanatory view for a case where plane Z-X is divided into nine, with the face parallel to plane Z-X of the first rectangular parallelepiped lying at the center of FIG. 8.

(3-3) Check for plane Z-X:

Likewise, as shown in FIG. 8, by denoting a face of the rectangular parallelepiped 1p' that is parallel to plane Z-X of the reference coordinate system (the plane formed by the vertices V13', V11', V12' and V14' in FIG. 8) as plane (0, 0), and extending each side of plane (0, 0) to produce the planes (1, 1), (1, 0), (1, –1), (0, 1), (0, –1), (–1, 1), (–1, 0), and (–1, –1), thus plane Z-X is divided into a total of nine planes and then an interference check that is the same as the interference check performed for plane X-Y is also performed for plane Z-X.

(3-4) Integrated check:

When temporary interference 2 is judged for all the interference checks with respect to the planes X-Y, Y-Z and Z-X, it is judged that there is interference between the rectangular parallelepiped 1p and rectangular parallelepiped 2q.

(4) Check of whether the respective vertices of the rectangular parallelepiped 1p are within the rectangular parallelepiped 2q:

(4-1) Rotation that adapts the rectangular parallelepiped 2q to the reference coordinate system:

A conversion matrix M2 that rotationally converts the respective sides of the rectangular parallelepiped 2q so that same are parallel to each axis of the reference coordinate system (X, Y, Z axis coordinate system) is found and the coordinate values of each vertex are determined. The rectangular parallelepiped 2q at this time then becomes the rectangular parallelepiped 2q''. The respective vertices of the rectangular parallelepiped 2q'' thus found through such rotational conversion are then V21'', V22'', V23'', V24'', V25'', V26'', V27'', and V28''.

$$M2 = \begin{pmatrix} M211 & m212 & m213 \\ M221 & m222 & m223 \\ M231 & m232 & m233 \end{pmatrix} \quad (5)$$

Further, the respective vertices of the rectangular parallelepiped 1p are then similarly converted by using the conversion matrix M2 thus found and thus the coordinate values of each of the vertices V11'', V12'', V13'', V14'', V15'', V16'', V17'', and V18'' of the rectangular parallelepiped 1p'' are determined.

Figure 9:
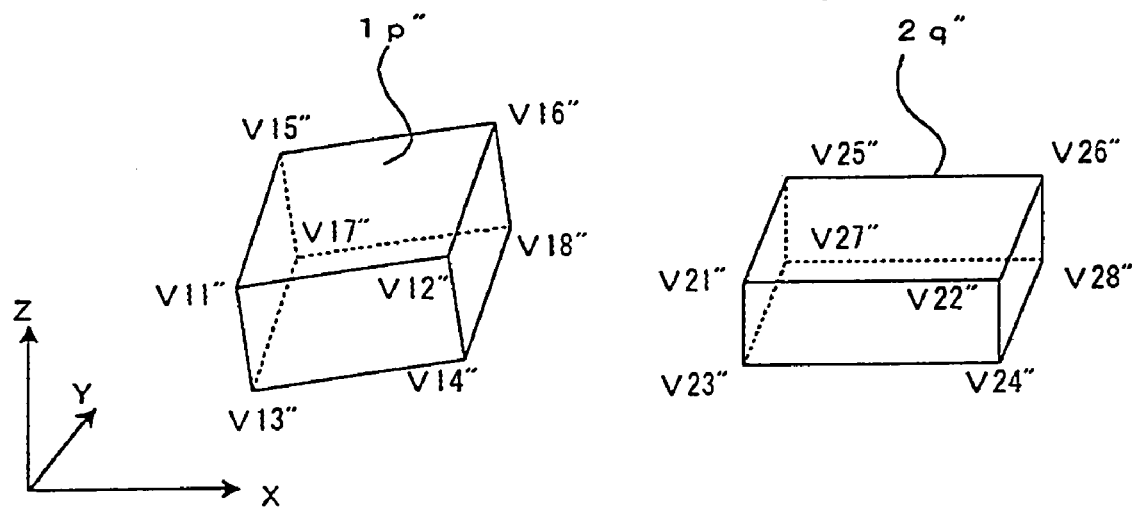
FIG. 9 represents a state where two rectangular parallelepipeds are rotated so that each side of the rectangular parallelepiped constituting the shape of the second machine part is parallel to each axis of the reference coordinate system.

FIG. 9 shows the states of the rectangular parallelepipeds 1p" and 2q" rendered by converting each side of the rectangular parallelepiped 2q in this way so that each side is parallel to each axis of the reference coordinate system.

In these states, it is judged whether or not any vertex of the rectangular parallelepiped 1p" exists within the rectangular parallelepiped 2q". As per the aforementioned check in (2) to determine whether each vertex of the rectangular parallelepiped 2q' lies within the rectangular parallelepiped 1p∝, a vertex α (x1, y1, z1) and a vertex β (x2, y2, z2) satisfying x1<x2, y1<y2, z1<z2 are selected from among the eight vertices of the rectangular parallelepiped 2q". In the example of the rectangular parallelepiped 2q" in FIG. 9 mentioned above, vertex V23" may be chosen as vertex α and vertex V26" may be chosen as vertex β.

Supposing that one given vertex of the vertices of the rectangular parallelepiped 1p" is considered and the coordinate of this vertex is (X0, Y0, Z0), when 'Condition 2' below, which is similar to 'Condition 1' mentioned above, is fulfilled, this means that the vertex lies within the rectangular parallelepiped 2q" and therefore interference exists.

'Condition 2': x1≦X0≦x2 and y1≦Y0≦y2, and z1≦Z0≦z2

When at least one of the eight vertices of the rectangular parallelepiped 1p" satisfies 'Condition 1', this means that rectangular parallelepiped 1p" interferes with rectangular parallelepiped 2q". When none of the eight vertices satisfies the 'Condition 1', the rectangular parallelepiped 1p" does not interfere with rectangular parallelepiped 2q".

Further, the interference check of the sides of the rectangular parallelepiped 2q with respect to the rectangular parallelepiped 1p need not be performed here, because this check is a check of a side with another side, and has already performed in the interference check of the sides of the rectangular parallelepiped 1p with respect to the rectangular parallelepiped 2q in (3) mentioned above.

The algorithm of the interference check of this embodiment was described above. The processing of this algorithm is implemented by a numerical control device, which performs an interference check during machining.

Figure 10:
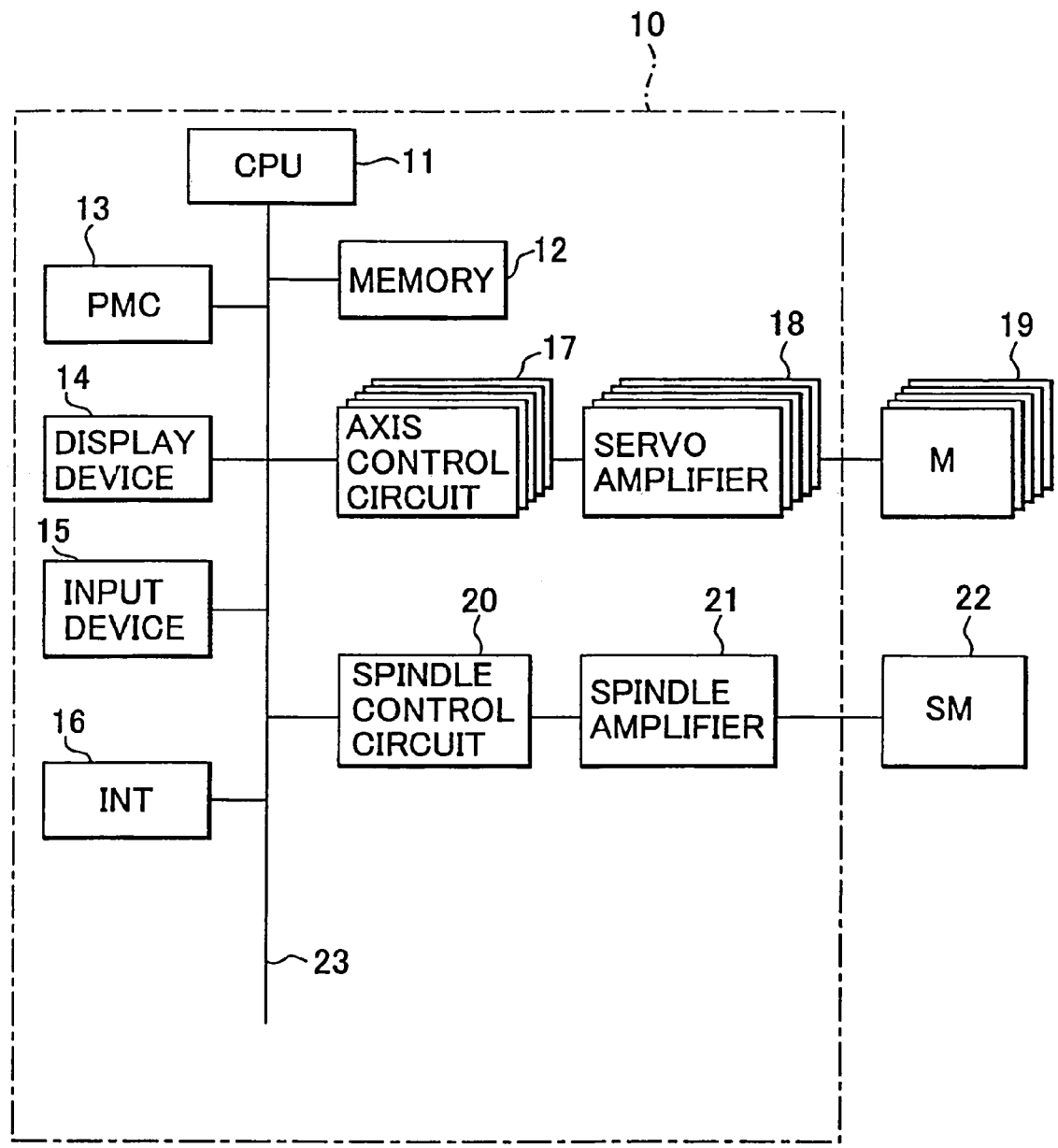
FIG. 10 is a block diagram of the principal parts of a first embodiment of the numerical control device of the present invention.

FIG. 10 is a block diagram of the principal parts of the numerical control device of an embodiment of the present invention that implements the above interference check algorithm.

The CPU 11 is a processor that performs overall control of a numerical control device 10, The processor 11 is connected via a bus 23 to a memory 12 that is constituted by ROM, RAM, nonvolatile RPAM, and so forth, a programmable machine controller (PMC) 13, a display device 14 that is constituted by a CRT, liquid crystals or the like, an input device 15, such as a keyboard, for inputting various instructions and data, an interface 16 that is connected to an external storage medium, host computer and so forth, an axis control circuits 17 for the respective axes of a machine tool (an example that comprises five axis control circuits is shown in FIG. 10), and a spindle control circuit 20.

The CPU 11 reads system programs stored in the ROM of the memory 12 via the bus 23 and controls the whole of the numerical control device in accordance with these system programs. Further, where the present invention is concerned, the memory 12 stores software (described subsequently) for implementing the interference check algorithm, and the shape of each machine part for which interference is possible is defined by means of a combination of one or more polyhedrons (rectangular parallelepipeds in this embodiment) and the data for these shapes thus defined is stored in the memory 12.

The PMC 13 outputs a signal to a machining tool auxiliary device that is controlled by a sequence program built into the numerical control device 10 or inputs a signal from the auxiliary device to perform control. Further, the PMC 13 receives signals of a variety of switches or the like of an operating panel that is provided on the main body of the machining tool controlled by the numerical control device and passes these signals to the CPU 11 after subjecting these signals to the required processing.

The axis control circuits 17 for the respective axes (five axes) receives movement commands that are interpolated for and distributed among the respective axes by the CPU 11 and outputs the commands of each axis to a servo amplifier 18. The servo amplifier 18 receives the commands and drives a servo motor 19 of each axis of the machining tool. The servo motor 19 of each axis is provided with a built-in a position/speed detector and feeds back a position/speed feedback signal from the position/speed detector to the axis control circuit 17 to perform position/speed feedback control. In FIG. 10, illustration of position/speed feedback is omitted.

Further, the spindle control circuit 20 receives a main axis rotation instruction and outputs a spindle speed signal to the spindle amplifier 21. The spindle amplifier 21 receives a spindle speed signal and rotates the spindle motor 22 at the instructed rotational speed. The rotational speed of the main axis is also detected by an encoder (not shown) and fed back to the spindle control circuit 20 to perform speed control.

The constitution of the numerical control device 10 described above does not differ from that of a conventional five-axis control numerical control device except for the fact that the software implementing the interference check algorithm and the data defining the shape of each machine part are stored in the memory 12 as mentioned above.

Figure 11:
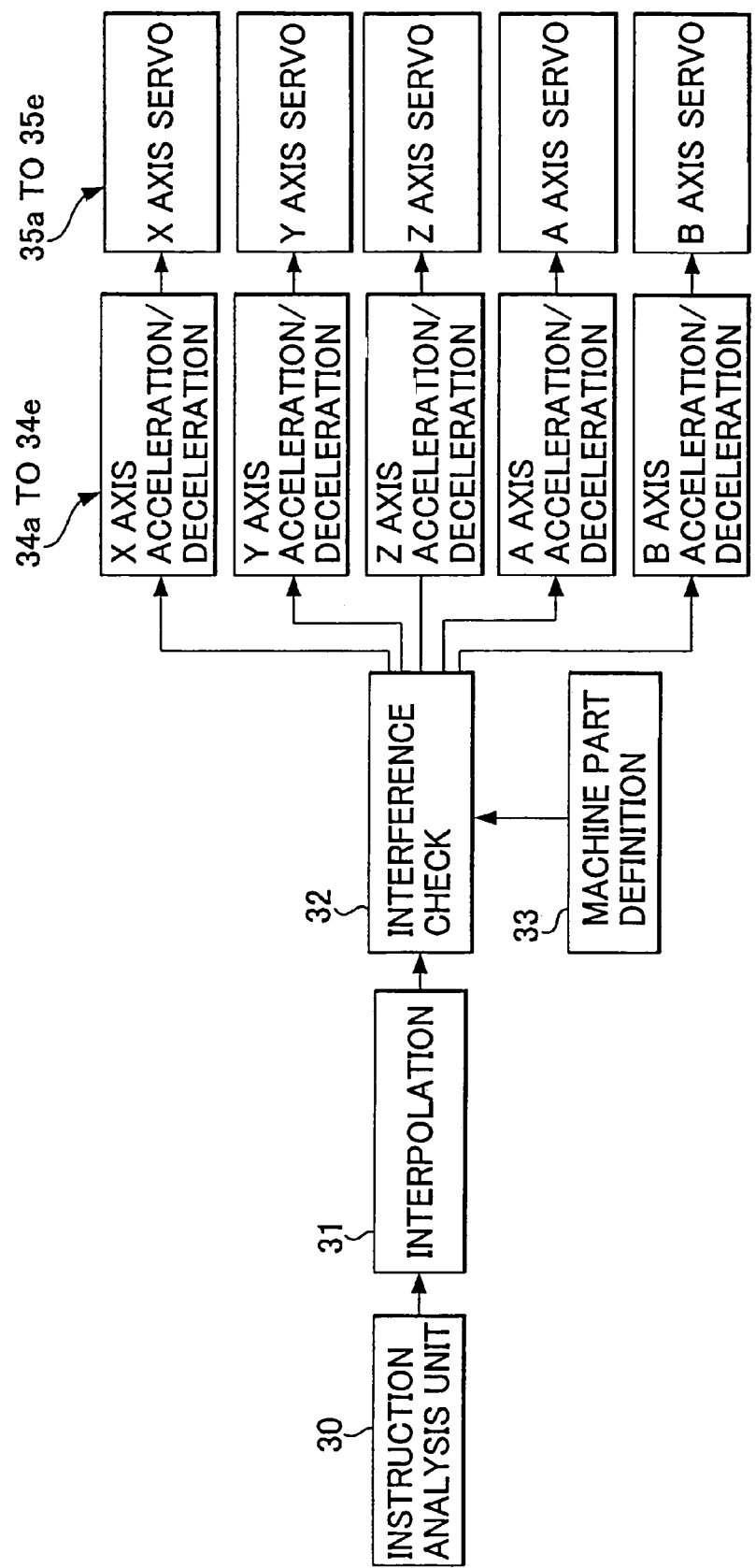
FIG. 11 is a functional block diagram of the numerical control device in FIG. 1.

FIG. 11 is a functional block diagram of the embodiment. An instruction analysis unit 30 analyzes the machining program and converts same into an executable format, and an interpolation processing unit 31 performs interpolation processing and outputs a movement command for each axis. Conventionally, the movement commands are directly outputted to acceleration/deceleration units 34a to 34e for respective axes. However, according to the present embodiment, an interference check is performed by an interference check unit 32 and then the movement commands are outputted to each of the axis acceleration/deceleration units 34a to 34e. The interference check unit 32 performs an interference check on the basis of definitions 33 of machine part shapes using a combination of polyhedrons. The acceleration/deceleration units 34a to 34e for respective axes subject the movement commands to acceleration/deceleration processing and drive the servo motors for respective axes by performing servo controls 35a to 35e (position, speed, and current feedback control) on the basis of movement commands for respective axes for which acceleration/deceleration processing has been finished.

FIGS. 12 to 16 are flowcharts for the interference check processing that is implemented by the numerical control device processor 11 as a function of the interference check unit 32.

Figure 12:
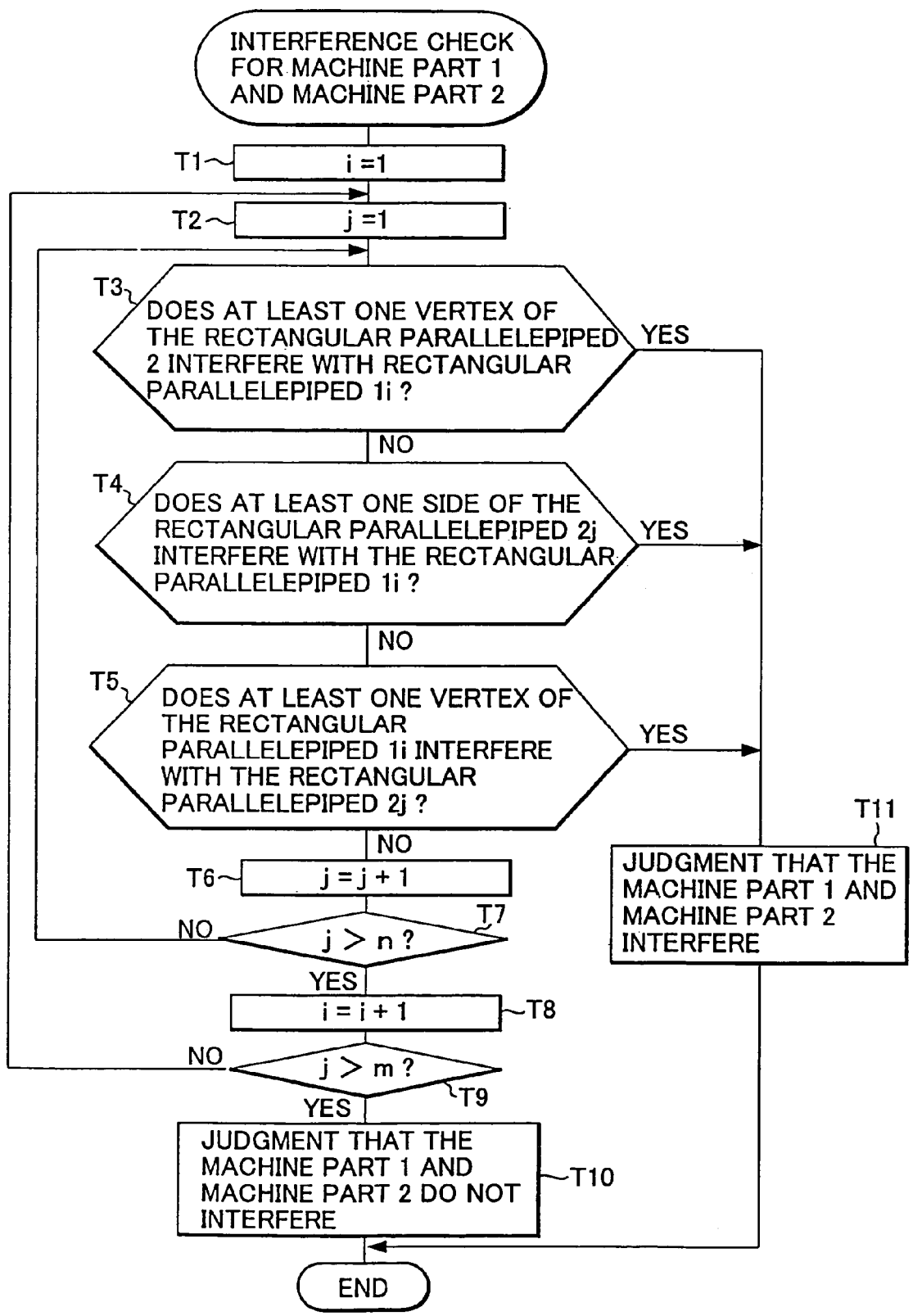
FIG. 12 is a flowchart for main processing to check for interference between two machine parts of an embodiment of the numerical control device of the present invention.

FIG. 12 represents the main processing of the interference check processing. An interference check to determine whether the machine part 1 and the machine part 2 interfere with each other is performed on the basis of the movement command positions that are outputted as a result of interpolation processing. For example, in the case of the five-axis machining tool shown in FIGS. 17 to 19, an interference check to determine whether or not interference exists between the tool 2 and jig 3 or between the tool 2 and table 1 is performed.

First, an index i that designates one of a plurality of polyhedrons that define the machine part 1 and an index j that designates one of a plurality of polyhedrons that define the machine part 2 are each set to '1' (steps T1, T2), and a judgment (interference check) of whether each vertex of the rectangular parallelepiped 2j of the machine part 2 lies within a rectangular parallelepiped 1i of the machine part 1 is performed (step T3). That is, the processing of the algorithm (2) is performed. Further, the details of this processing are explained with reference to FIG. 13. Further, if at least one of the vertices of the rectangular parallelepiped 2j of the machine part 2 exists within the rectangular parallelepiped 1i of the machine part 1, it is judged that there is interference between the machine part 1 and machine part 2 and a movement command is not outputted to the acceleration/deceleration units 34a to 34e, the interpolation operation is terminated, the machine operation is terminated and an alarm or similar is displayed on the display device 14 (step T11).

On the other hand, if none of the vertices of the rectangular parallelepiped 2j of the machine part 2 exists within the rectangular parallelepiped 1i of the machine part 1, the processing proceeds to step T4 to execute processing to judge whether or not the sides of the rectangular parallelepiped 2j of the machine part 2 interfere with the rectangular parallelepiped 1i of the machine part 1 (step T4). This processing is the processing of the algorithm (3) mentioned above and the details of this processing will be described with reference to FIGS. 14 and 15. Next, in cases where it is judged in this processing that at least one side of the rectangular parallelepiped 2j interferes with the rectangular parallelepiped 1i, the processing proceeds to step T11, whereupon the interpolation is terminated, the machine operation is terminated and an alarm is displayed as explained above.

In cases where interference is not judged to exist even in the judgment processing of step T4, the processing proceeds to step T5 and an interference check to judge whether the vertices of the rectangular parallelepiped 1i of the machine part 1 exist within the rectangular parallelepiped 2j of the machine part 2 is performed. That is, the processing of the algorithm (4) mentioned above is performed, the details of which are explained with reference to FIG. 16.

In cases where interference is not judged to exist by the processing in step T5, index j is incremented by 1 (step T6), and it is judged whether or not the value of this index j exceeds the number n of rectangular parallelepipeds defining the machine part 2 (step T7) If the value does not exceed the number n, the processing returns to step T3 and the above processing is repeated. Unless it is judged that interference exists, the processing of steps T3, T4, T5, T6, T7 is repeated and it is judged whether all the rectangular parallelepipeds 21, 22, . . . 2m defining the shape of the machine part 2 interfere with one rectangular parallelepiped 1i among the plurality of rectangular parallelepipeds that define the shape of the machine part 1. If no such interference exists, the processing proceeds from step T7 to step T8, whereupon the index i, which designates one of the rectangular parallelepipeds that specify the shape of the machine part 1, is incremented by 1. It is then judged whether or not the index i exceeds the number m of rectangular parallelepipeds that define the machine part 1 (step T9). Unless this number is exceeded, the processing returns to step T2 and the above processing is repeated. That is, it is judged whether any of the rectangular parallelepipeds of the machine part 2 interferes with the next single rectangular parallelepiped that defines the machine part 1.

Unless interference is judged to exist, the processing of steps T2 to T9 is repeated until the number m of rectangular parallelepipeds defining the shape of the machine part 1 is exceeded and, unless it is judged that interference exists between all the rectangular parallelepipeds of the machine part 1 and all the rectangular parallelepipeds of the machine part 2, noninterference is judged to exist in step T10, and a movement command is outputted to the acceleration/deceleration units for respective axes to execute the machining tool operation.

The above processing is performed between the machine part 1 and machine part 2 for which the possibility of interference exists. In the examples of FIG. 17 to FIG. 19, an interference check is performed to whether or not interference exists between the tool 2 and table 1 and between the tool 2 and jig 3.

Figure 13:
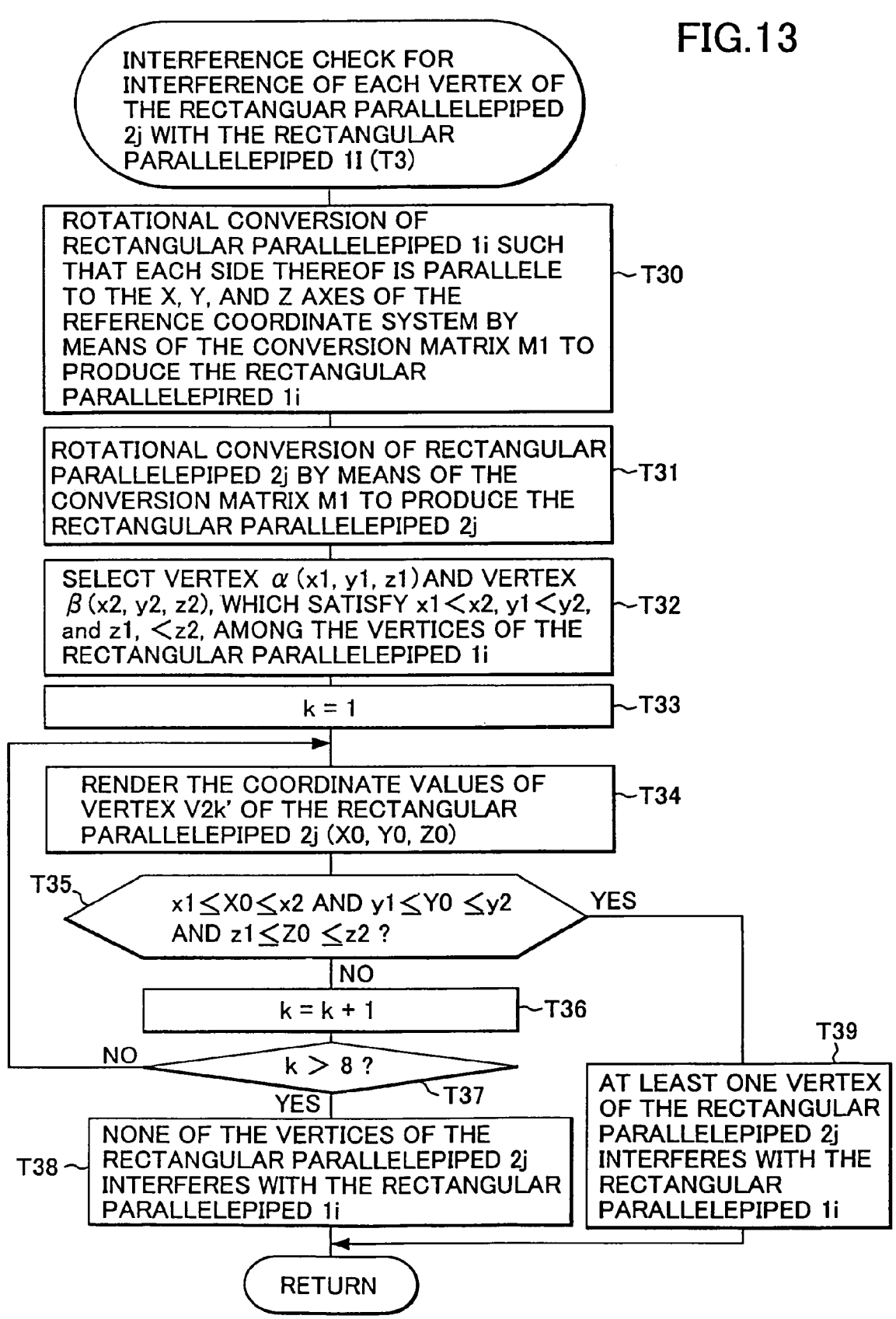
FIG. 13 is a flowchart for the interference judgment processing in step T3 of the main processing of FIG. 12.

FIG. 13 shows the detailed processing of an interference check to determine whether the vertices of the rectangular parallelepiped 2j of the machine part 2 lie within the rectangular parallelepiped 1i of the machine part 1 in the processing of step T3 mentioned above.

A conversion matrix M1 that rotationally converts the rectangular parallelepiped 1i of the machine part 1 so that each side of the rectangular parallelepiped 1i lies parallel to each axis of the reference coordinate system (the X, Y, Z axis coordinate system), and the coordinate values (x, y, z) of the vertices (V11', V12', V13', V14', V15', V16', V17', and V18') of the rectangular parallelepiped 1i' found through such rotational conversion are determined (step T30). Further, each of the vertices of the rectangular parallelepiped 2j of the machine part 2 is converted by using the conversion matrix M1 and the coordinate values (X, Y, Z) of the respective vertices (V21', V22', V23', V24', V25', V261, V27' and V28') of the rectangular parallelepiped 2j' are thus found (step T31).

A vertex α (x1, y1, z1) and a vertex β (x2, y2, z2) that satisfy the conditions x1<x2, y1<y2, and z1<z2 is selected from among the vertices of the rectangular parallelepiped 1i' (step T32). Further, an index k, which designates the vertices of the rectangular parallelepiped 2j', is set at '1' (step T33) and it is judged whether or not the coordinate values (X0, Y0, Z0) of vertex V2k' of the rectangular parallelepiped 2j' indicated by index k fulfill 'Condition 1' mentioned above (steps T34 and T35).

When 'Condition 1' ($x1 \leq X0 \leq x2$ and $y1 \leq Y0 \leq y2$ and $z1 \leq Z0 \leq z2$) satisfied, it is assumed that interference has occurred between the corresponding rectangular parallelepipeds (step T39) and the processing returns to the main processing, whereupon the processing of step T11 is executed and the machine operation is terminated. On the other hand, when 'Condition 1' mentioned above is not satisfied, the index k is incremented by '1' (step T36) and it is judged whether or not the value of index k exceeds the number of vertices 8 (step T37). Unless this number is exceeded, the processing returns to step T34 and the above processing is repeated. When none of the eight vertices satisfies 'Condition 1' mentioned above, it is judged that the rectangular parallelepiped 2j' interferes with the rectangular parallelepiped 1i (step T38), the processing returns to the main processing, and then proceeds to step T4.

As a result of the above processing, an interference check to check for interference between the respective rectangular parallelepipeds of the machine part 1 and each of the rectangular parallelepipeds of the machine part 2 is executed. Interference is judged to exist when a vertex of any rectangular parallelepiped of the machine part 2 exists within any rectangular parallelepiped of the machine part 1.

Figure 14:
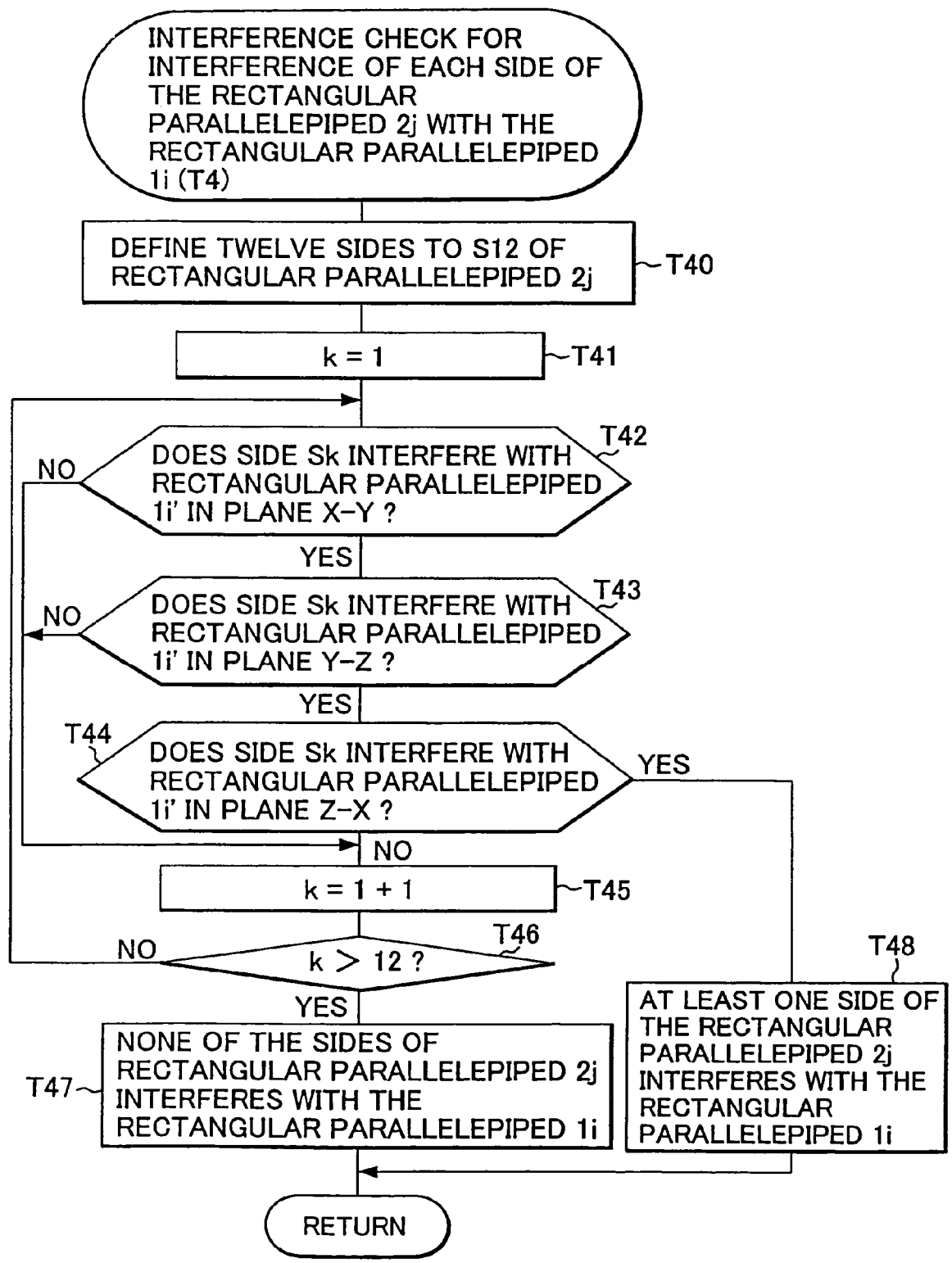
FIG. 14 is a flowchart for the interference check in step T42 of the main processing of FIG. 12.

FIG. 14 provides details of an interference check with respect to the sides of the rectangular parallelepiped 1i and rectangular parallelepiped 2j of step T4 of the main processing shown in FIG. 12.

First, each side of the rectangular parallelepiped 2j is defined and the coordinates (X, Y, Z) of the ends (vertices) of the sides are stored. Each side is defined as S1 to S12 such that the side between the vertices V21' and V22' of the rectangular parallelepiped 2j is S1 and the side between the vertices V21' and V23' is S2, for example. The coordinates (X, Y, Z) of the ends of each of the sides S1 to S12 are then stored (step T40). Index k, which designates a side of the rectangular parallelepiped 2j, is then set at '1' (step T41) and it is judged, first for plane X-Y, whether or not the side Sk interferes with the rectangular parallelepiped 1i of the machine part 1 (step T42). Further, the details of the processing in which it is judged that side Sk interferes with the rectangular parallelepiped 1i are explained with reference to FIG. 15.

Unless it is judged that side Sk interferes with the rectangular parallelepiped 1i in plane X-Y, the processing proceeds to step T45. On the other hand, when it is judged that interference (temporary interference 2) exists, processing proceeds to step T43, and it is judged whether or not side Sk interferes with the rectangular parallelepiped 1i in plane Y-Z. As a result, unless noninterference is judged, the processing proceeds to step T45 and, unless interference (temporary interference 2) is judged, the processing proceeds to step T44. It is then judged whether or not side Sk interferes with the rectangular parallelepiped 1i in of plane Z-X and unless noninterference is judged as a result, the processing proceeds to step T45. If interference (temporary interference 2) is judged to exist (in cases where temporary interference 2 is ultimately judged in all the planes X-Y, Y-Z, Z-X), the processing proceeds to step T48, whereupon it is judged that at least one side of the rectangular parallelepiped 2j interferes with the rectangular parallelepiped 1i. The processing then returns to the main processing, and the machine operation is terminated and an alarm is outputted as mentioned above in step T11.

In addition, unless it is judged that there is interference in the processing of any of steps T42, T43, and T44, the index k is incremented by '1' (step T45) and it is judged whether or not the index k has exceeded the number of sides, 12 (step T46). Unless this number has been exceeded, the processing returns to step T42, and the judgment of step T42 and subsequent steps with regard to whether side Sk indicated by index k interferes with the rectangular parallelepiped 1i is performed. Further, when index k exceeds 12 and when it has not been judged that all the sides S1 to S12 interfere with the rectangular parallelepiped 1i (step T47), the processing returns to the main processing in FIG. 12 and the transition to the processing in step T5 is made.

Figure 15:
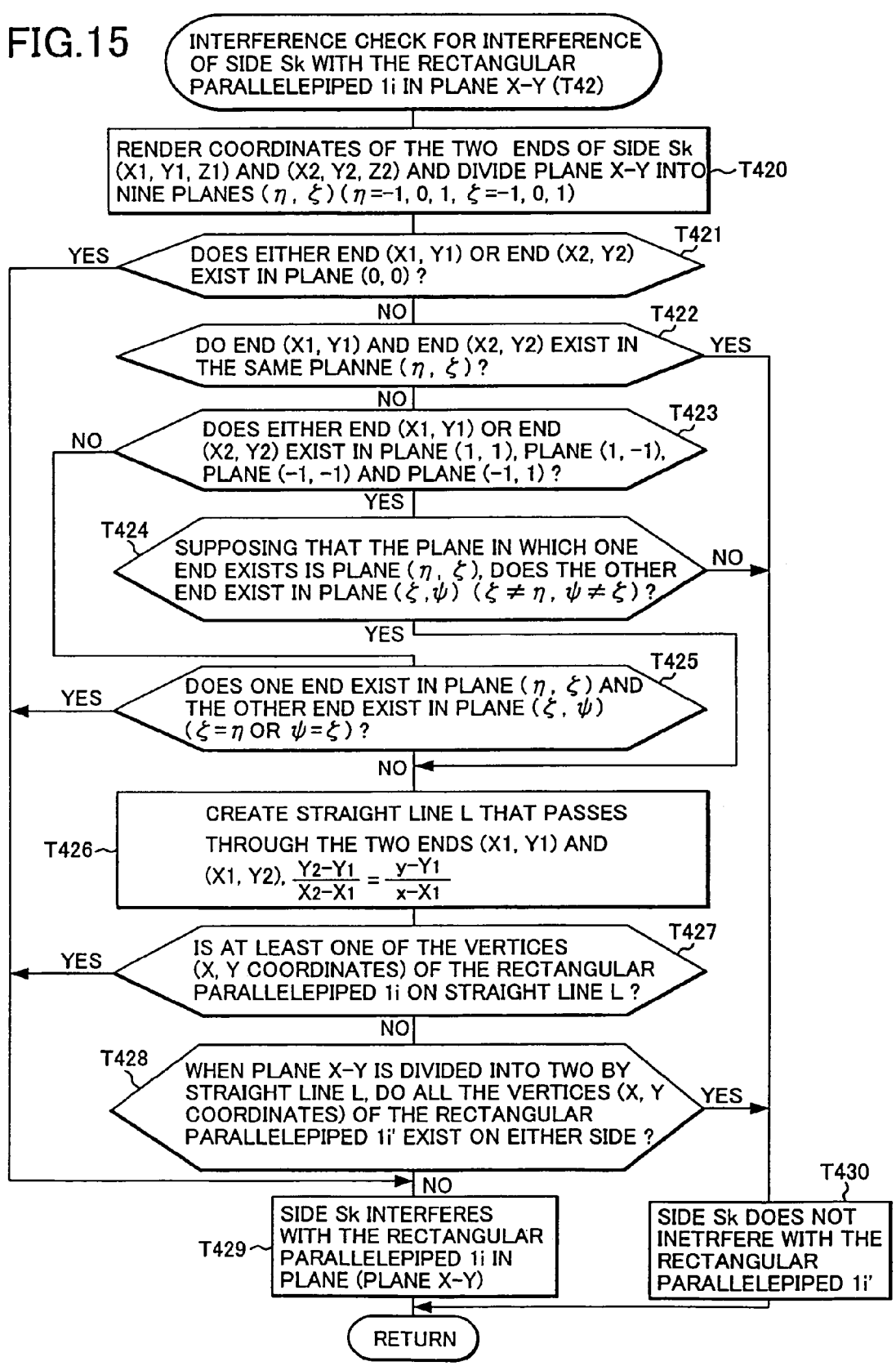
FIG. 15 is a flowchart for the interference check in plane X-Y of step T42 of FIG. 14.

FIG. 15 is a flowchart for detailed processing of the processing of step T42 in FIG. 14 to determine whether side Sk of the rectangular parallelepiped 2j interferes with the rectangular parallelepiped 1i in plane X-Y.

First, the coordinates of the two ends of side Sk of the rectangular parallelepiped 2j of the machine part 2 are (X1, Y1, Z1) and (X2, Y2, Z2). Further, by denoting a face of the rectangular parallelepiped 1p' that is parallel to plane X-Y of the reference coordinate system as plane (0, 0), and extending each side of plane (0, 0) to produce the planes (1, 1), (1, 0), (1, −1), (0, 1), (0, −1), (−1, 1), (−1, 0), and (−1, −1), plane X-Y is divided into a total of nine planes (step T420).

Thereafter, a judgment of whether either end of side Sk of the rectangular parallelepiped 2j exists in plane (0, 0) is made. A detailed description of this judgment method will not be provided here because same was already described in (3-1-1). If one end (X1, Y1, Z1) of side Sk or the other end (X2, Y2, Z2) thereof exists in plane (0, 0), the processing proceeds to step T429 and it is judged that interference (temporary interference 2) exists in plane X-Y (step T421).

On the other hand, if neither one end (X1, Y1, Z1) nor the other end (X2, Y2, Z2) of side Sk exists in plane (0, 0), the processing proceeds to step T422 and it is judged whether both ends exist in the same plane. This judgment processing will not be described in detail here because the details were already explained in (3-1-2). When it is judged that both ends of side Sk exist in the same plane other than plane (0, 0), the processing proceeds to step T430 and it is judged that noninterference exists for side Sk.

When is has been judged that both ends of side Sk are not in the same plane, the processing proceeds to step T423 and it is judged whether either one of these ends exists in planes at the four corners of plane (0, 0), that is, in plane (1, 1), plane (1, −1), plane (−1, −1) and plane (−1, 1). When neither of the two ends of side Sk exists in the four-corner planes, the processing proceeds to step T425 but, when, on the other hand, either of the two ends exists in the four-corner planes of plane (0, 0), the processing proceeds to step T424. In step T424, it is judged whether or not it is possible for the other end of side Sk to reach a plane which exists across the plane (0, 0).

When one end of side Sk exists in any plane (η, ζ)((1, 1), (1, −1), (−1, −1) or (−1, 1)) at the four corners of plane (0, 0) and the plane in which the other end exists is taken to be plane (η', ζ'), if η≠η' and ζ≠ζ' are fulfilled, then it is possible for side Sk to transect plane (0, 0). The processing then proceeds to step T426, judging that temporary interference 1 exists. Further, if at least one of η=η' and ζ=ζ' is fulfilled, side Sk does not transect the plane (0, 0), and hence noninterference is judged and the processing proceeds to step 430.

On the other hand, in step T423, when neither end of side Sk exists in plane (1, 1), plane (1, −1), plane (−1, −1) or plane (−1, 1) at the four corners of plane (0, 0), the processing proceeds to step T425, and, when one end exists in plane (η, ζ), the other end exists in plane (η', ζ'), and either η=η' or ζ=ζ' is fulfilled, it is judged that temporary interference 2 exists, and hence processing proceeds to step T429. Otherwise, it is judged that temporary interference 1 exists and the processing proceeds to step T426. That is, when it is certain that side Sk transects plane (0, 0), temporary interference 2 is judged and, when there is the possibility of side Sk transecting plane (0, 0) or when there is no such transaction, temporary interference 1 is judged.

When temporary interference 1 is judged in step T424 and step T425, the additional judgment of steps T426 to T428 is performed. First, a straight line L that passes through one end (X1, Y1) and the other end (X2, Y2) of side Sk is created and, if one of four points of the rectangular parallelepiped 1i' on the X-Y coordinates exists on the straight line L (step T427), temporary interference 2 is judged and processing proceeds to step T429. In addition, all four points of the rectangular parallelepiped 1i on the X-Y coordinates exist on one side of a face that is divided by the straight line L (step T428), although no point exists on the straight line L, plane (0, 0) is not divided and straight line L does not pass through the rectangular parallelepiped 1i. Hence noninterference exists and the processing proceeds to step T430. Further, when four points of the rectangular parallelepiped 1i' are seen on both sides of the straight line L, plane (0, 0) is transected by straight line L and hence possibility of interference exists. Therefore, temporary interference 2 is judged because the possibility of interference exists, and therefore the processing proceeds to step T429. Further, the details of the judgment processing of steps T427 and T428 will be omitted here because a detailed description was already provided in (3-1-5).

The processing then proceeds to step T430 and, when it is judged that side Sk of the rectangular parallelepiped 2j of machine part 2 does not interfere with the rectangular parallelepiped 1i' of the machine part 1, the processing proceeds to step T45 shown in FIG. 14. Further, when temporary interference 2 is judged in step T429, the processing proceeds to step T43 in FIG. 14, and it is judged whether noninterference or temporary interference 2 exists in plane Y-Z. A detailed description of this judgment for plane Y-Z will be omitted here. However, the judgment is executed in the same manner as the judgment for plane X-Y shown in FIG. 15. The side of the rectangular parallelepiped 2j becomes the side on the plane Y-Z, the coordinates of the two ends of this side being (Y1, Z1) and (Y2, Z2). A face of the rectangular parallelepiped 1i that is parallel to plane Y-Z becomes plane (0, 0). Otherwise, the processing is the same as the processing of FIG. 15.

Further, the detailed processing of step T44 is the same as that of FIG. 15. In this case, the side of the rectangular parallelepiped 2j is the side on plane Z-X, the coordinates of the two ends of this side being (Z1, X1) and (Z2, X2) and a face of the rectangular parallelepiped 1i that is parallel to plane Z-X becomes plane (0, 0) Otherwise, the processing is the same as that of FIG. 1.5.

Figure 16:
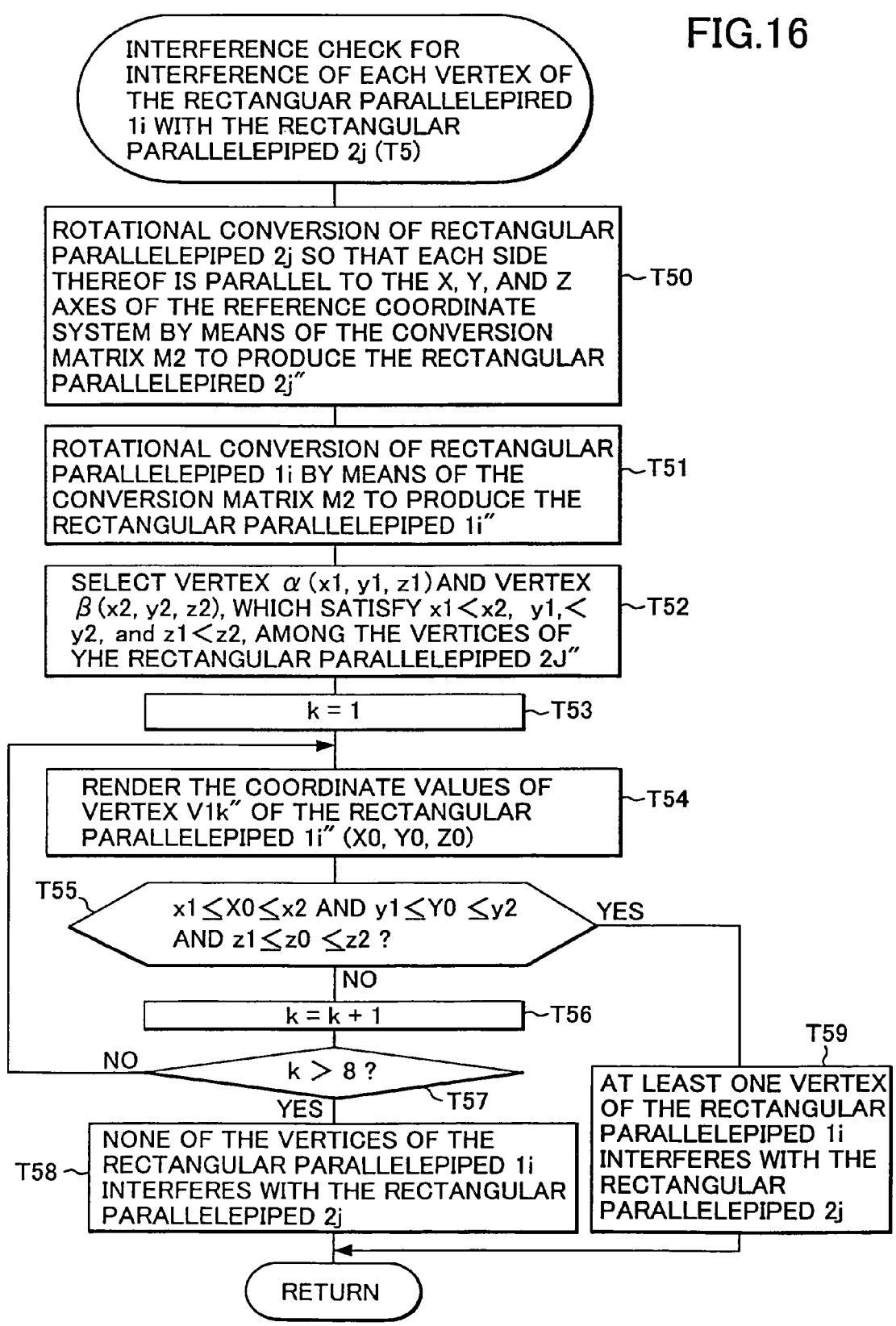
FIG. 16 is a flowchart for the interference judgment processing of step T5 of the main processing of FIG. 12.

It is then judged whether or not the sides of the rectangular parallelepiped 2j and rectangular parallelepiped 1i interfere with each other as detailed above and, when noninterference is judged, the processing proceeds from step T4 to step T5 in FIG. 12, whereupon the judgment processing to determine whether at least one vertex of the rectangular parallelepiped 1i exists within and interferes with the rectangular parallelepiped 2j is executed. The details of this processing are shown in FIG. 16. The processing shown in FIG. 16 is the same as the processing to determine whether each vertex of the rectangular parallelepiped 2j shown in FIG. 13 interferes with the rectangular parallelepiped 1i, with only the rectangular parallelepiped 2j and rectangular parallelepiped 1i replaced with each other. Because a detailed algorithm has already been described, a detailed description of the processing shown in FIG. 16 will be omitted here.

Thus, according to the present embodiment, an interference check is performed based on interpolated command positions in the course of machining by a machining tool. When it seems that interference will occur, interpolation is terminated, movement commands are no longer outputted and the machine operation is terminated, whereby the occurrence of interference between machine parts is prevented.

Further, the occurrence of machine part interference may be confirmed by means of a dry run operation in which a machining program is executed but mechanical machining is not performed. In addition, program positions in which interference occurs may be displayed on the display device 14.

Moreover, although polyhedrons constituting means for defining the shapes of machine parts were rectangular parallelepipeds in the embodiment mentioned above, the machine part shapes being defined by combinations of one or more rectangular parallelepipeds, other shapes are also acceptable. A tool or the like may be defined by means of a pyramid shape or other shape, for example.

What is claimed is:

1. A numerical control device that drive-controls each axis of a machining tool on the basis of a machining program, comprising:
   a memory for storing data rendered by defining the shape of a machine part of the machining tool as a polyhedron;
   an instruction analysis unit that analyzes the machining program and generates data for an operation path;
   interpolation means that outputs a position of a machine part on the operation path for each sampling cycle on the basis of the generated data;
   means for finding the positions of the polyhedron shapes of a machine part in accordance with each axial position generated by the interpolation means; and
   interference checking means that checks whether there is interference between the polyhedron shapes of a plurality of machine parts in the positions of the polyhedron shapes thus found.

2. The numerical control device according to claim 1, wherein the shape of the machine part is defined by a combination of one or more polyhedrons.

3. A numerical control device that drive-controls each axis of a machining tool on the basis of a machining program, comprising:
   a memory for storing data rendered by defining the shape of a machine part of the machining tool as a polyhedron;
   an instruction analysis unit that analyzes the machining program and generates data for an operation path;
   interpolation means that outputs a position of a machine part on the operation path for each sampling cycle on the basis of the generated data;
   means for finding the positions of the polyhedron shapes of a machine part in accordance with each axial position generated by the interpolation means; and
   interference checking means that checks whether there is interference between the polyhedron shapes of a plurality of machine parts in the positions of the polyhedron shapes thus found;
   wherein the polyhedron is a rectangular parallelepiped; and
   wherein the interference checking means check whether a vertex of one rectangular parallelepiped belonging to a first machine part interferes with one rectangular parallelepiped belonging to a second machine part and whether a side of one rectangular parallelepiped belonging to the first machine part interferes with one rectangular parallelepiped belonging to the second machine part.

4. The numerical control device according to claim 1, wherein interpolation is terminated when interference is judged by the interference checking means.

5. The numerical control device according to claim 1, wherein the axes of the machining tool include at least one rotational axis.

6. The numerical control device according to claim 1, wherein a tool is tilted by at least one rotational axis of the machining tool.

7. The numerical control device according to claim 1, wherein a table is rotated by at least one rotational axis of the machining tool.

8. The numerical control device according to claim 1, wherein a tool and a table are rotated by at least two rotational axes of the machining tool.

9. The numerical control device according to claim 1, wherein the interference checking means check whether a vertex of one polyhedron belonging to a first machine part interferes with one polyhedron belonging to a second machine part and whether a side of one polyhedron belonging to the first machine part interferes with one polyhedron belonging to the second machine part.

10. A method for controlling each axis of a machining tool using a numerical control device, comprising:

defining the shape of a machine part of the machining tool as a polyhedron;

interpolating the position of a machine part on an operation path for each sampling cycle;

finding the positions of the polyhedron shapes of a machine part in accordance with each axial position generated by the interpolation; and checking whether there is interference between the polyhedron shapes of a plurality of machine parts in the positions of the polyhedron shapes thus found.

11. The method for controlling each axis of a machining tool using a numerical control device according to claim 10, further comprising:

checking whether a vertex of one polyhedron belonging to a first machine part interferes with one polyhedron belonging to a second machine part and whether a side of one polyhedron belonging to the first machine part interferes with one polyhedron belonging to the second machine part.

* * * * *

UNITED STATES PATENT AND TRADEMARK OFFICE
CERTIFICATE OF CORRECTION

PATENT NO.        : 7,239,938 B2
APPLICATION NO.   : 10/968127
DATED             : July 3, 2007
INVENTOR(S)       : Toshiaki Otsuki et al.

It is certified that error appears in the above-identified patent and that said Letters Patent is hereby corrected as shown below:

Sheet 1 of 13 (Fig, 3), Line 1, change "1 p" to --1 p'--.

Sheet 1 of 13 (Fig. 3), Line 1, change "2 q" to --2 q'--.

Sheet 8 of 13 (Above Box No. T30) (Fig. 13), Line 3, change "RECTANGUAR" to --RECTANGULAR--.

Sheet 8 of 13 (Above Box No. T30) (Fig. 13), Line 5, change "1I" to --1i--.

Sheet 8 of 13 (Box No. T30) (Fig. 13), Line 3, change "PARALLELE" to --PARALLEL--.

Sheet 8 of 13 (Box No. T30) (Fig. 13), Line 8, change "PARALLELEPIRED" to --PARALLELEPIPED--.

Sheet 8 of 13 (Box. No T32) (Fig. 13), Line 3, change "z1, <z2," to --z1<z2,--.

Sheet 10 of 13 (Box No. T422) (Fig. 15), Line 2, change "PLANNE" to --PLANE--.

Sheet 10 of 13 (Box No. T430) (Fig. 15), Line 2, change "INETRFERE" to --INTERFERE--.

Sheet 11 of 13 (Above Box No. T50) (Fig. 16), Line 3, change "RECTANGUAR" to --RECTANGULAR--.

Sheet 11 of 13 (Above Box No. T50) (Fig. 16), Line 3, change "PARALLELEPIRED" to --PARALLELEPIPED--.

Sheet 11 of 13 (Box No. T50) (Fig. 16), Line 7, change "PARALLELEPIRED" to --PARALLELEPIPED--.

Sheet 11 of 13 (Box No. T52) (Fig. 16), Line 2-3, change "y1,<y2," to --y1<y2,--.

Sheet 11 of 13 (Box No. T52) (Fig. 16), Line 4, change "YHE" to --THE--.

Sheet 11 of 13 (Box No. T52) (Fig. 16), Line 4, change "2J"" to --2j"--.

Column 1, Line 34, change "that-establishes" to --that establishes--.

Column 2, Line 45, change "operation:" to --operation--.

UNITED STATES PATENT AND TRADEMARK OFFICE
CERTIFICATE OF CORRECTION

PATENT NO. : 7,239,938 B2
APPLICATION NO. : 10/968127
DATED : July 3, 2007
INVENTOR(S) : Toshiaki Otsuki et al.

It is certified that error appears in the above-identified patent and that said Letters Patent is hereby corrected as shown below:

Column 4, Line 33, before "and any" change "in" to --1n--.

Column 5 (Conversion Matrix M1), Line 3, change "*m121*" to --*m131*--.

Column 5, Line 55, after "1p'" insert --:--.

Column 6, Line 37, change "lie-within" to --lie within--.

Column 6, Line 49, change "y2<Y1," to --y1<Y1,--.

Column 6, Line 60, change "η≠η" to -- η≠η'--.

Column 7, Line 10, change "η≠η" to -- η≠η'--.

Column 7, Line 47, change "*(y-Y1)/x-X1)*" to --*(y-Y1)/(x-X1)*--.

Column 9, Line 10, change "1pα," to --1p',--.

Column 9, Line 51, change "RPAM," to --RAM,--.

Column 12, Line 38, change "V261," to --V26',--.

Column 12, Line 51, before "satisfied," insert --is--.

Column 12, Line 64, change "1i" to --1i'--.

Column 13, Line 35, before "plane" delete "of".

Column 14, Line 21, after "When" change "is" to --it--.

Column 15, Line 34, after "(0, 0)" insert --.--.

UNITED STATES PATENT AND TRADEMARK OFFICE
CERTIFICATE OF CORRECTION

| | |
|---|---|
| PATENT NO. | : 7,239,938 B2 |
| APPLICATION NO. | : 10/968127 |
| DATED | : July 3, 2007 |
| INVENTOR(S) | : Toshiaki Otsuki et al. |

It is certified that error appears in the above-identified patent and that said Letters Patent is hereby corrected as shown below:

Column 15, Line 35, change "1.5." to --15.--.

Signed and Sealed this

Thirteenth Day of November, 2007

JON W. DUDAS
*Director of the United States Patent and Trademark Office*